(12) United States Patent
Zhou et al.

(10) Patent No.: US 9,942,753 B2
(45) Date of Patent: Apr. 10, 2018

(54) METHOD AND SYSTEM FOR MONITORING AND RESTRICTING USE OF MOBILE DEVICES

(71) Applicants: Zheng Zhou, Edison, NJ (US); Richard Bromham, Melbourne (AU)

(72) Inventors: Zheng Zhou, Edison, NJ (US); Richard Bromham, Melbourne (AU)

(73) Assignee: Pervasive Group, Inc., Kearny, NJ (US)

( * ) Notice: Subject to any disclaimer, the term of this patent is extended or adjusted under 35 U.S.C. 154(b) by 316 days.

(21) Appl. No.: 14/060,560

(22) Filed: Oct. 22, 2013

(65) Prior Publication Data

US 2014/0113593 A1     Apr. 24, 2014

Related U.S. Application Data

(60) Provisional application No. 61/717,084, filed on Oct. 22, 2012, provisional application No. 61/757,310, filed on Jan. 28, 2013.

(51) Int. Cl.
*H04W 12/06* (2009.01)
*H04L 29/06* (2006.01)
*H04W 12/08* (2009.01)

(52) U.S. Cl.
CPC ........... *H04W 12/06* (2013.01); *H04L 63/20* (2013.01); *H04W 12/08* (2013.01)

(58) Field of Classification Search
CPC ........ H04W 12/06; H04W 12/08; H04L 63/20
See application file for complete search history.

(56) References Cited

U.S. PATENT DOCUMENTS

| | | | |
|---|---|---|---|
| 7,389,123 B2 | 6/2008 | Rydgren et al. | |
| 7,835,721 B2 | 11/2010 | Tuulos et al. | |
| 7,899,438 B2 | 3/2011 | Baker et al. | |
| 8,528,107 B1* | 9/2013 | Ginzton | G06F 21/6281 713/193 |
| 8,756,651 B2* | 6/2014 | Baer | G06F 21/577 713/168 |
| 9,197,668 B2* | 11/2015 | Boucher | G06F 21/6218 |
| 2006/0112428 A1 | 5/2006 | Etelapera | |
| 2006/0206925 A1* | 9/2006 | Dillaway | G06F 21/33 726/5 |
| 2006/0293057 A1 | 12/2006 | Mazerski et al. | |

(Continued)

FOREIGN PATENT DOCUMENTS

| | | |
|---|---|---|
| EP | 1 668 473 B1 | 6/2006 |
| EP | 2 369 864 A3 | 9/2011 |

(Continued)

*Primary Examiner* — Mehmood B Khan
(74) *Attorney, Agent, or Firm* — Chi Eng

(57) ABSTRACT

A system and method for promoting safe usage of a mobile device. The system allows one or more administrators (or patents) to transparently and automatically implement pre-configured use restriction policies (e.g., restricted time periods, restricted features of the device, restricted vehicle speed) on multiple managed devices. The restriction policies may be stored locally at a managed mobile device and/or remotely at a remote server and database. The mobile device can be controlled locally by a client application or remotely by the remote server based on the restriction policies.

61 Claims, 19 Drawing Sheets

(56) References Cited

U.S. PATENT DOCUMENTS

| | | | |
|---|---|---|---|
| 2008/0313264 A1* | 12/2008 | Pestoni | G06F 21/10 709/202 |
| 2009/0040947 A1* | 2/2009 | Krivopaltsev | H04L 41/0213 370/255 |
| 2009/0049166 A1* | 2/2009 | Roman | H04L 41/0213 709/223 |
| 2009/0049518 A1* | 2/2009 | Roman | H04L 41/0893 726/1 |
| 2009/0119779 A1* | 5/2009 | Dean | G06F 21/105 726/26 |
| 2011/0029435 A1* | 2/2011 | Ronen | G06Q 10/10 705/53 |
| 2012/0009896 A1* | 1/2012 | Bandyopadhyay | G06F 1/1643 455/411 |
| 2013/0017806 A1 | 1/2013 | Sprigg et al. | |
| 2013/0040629 A1 | 2/2013 | Sprigg et al. | |
| 2013/0159021 A1* | 6/2013 | Felsher | G06F 19/322 705/3 |
| 2013/0217331 A1 | 8/2013 | Manente | |
| 2013/0225151 A1 | 8/2013 | King et al. | |
| 2013/0225152 A1 | 8/2013 | Matthews, III et al. | |
| 2013/0312068 A1* | 11/2013 | Mortimore | H04L 63/10 726/4 |
| 2014/0130117 A1* | 5/2014 | Jeannot | H04L 63/08 726/1 |
| 2014/0213181 A1* | 7/2014 | Rosenberg | H04B 5/0031 455/41.1 |

FOREIGN PATENT DOCUMENTS

| | | | | |
|---|---|---|---|---|
| WO | WO 2009021200 A1 * | 2/2009 | | H04L 41/0893 |
| WO | WO2013/097715 A1 | 7/2013 | | |

\* cited by examiner

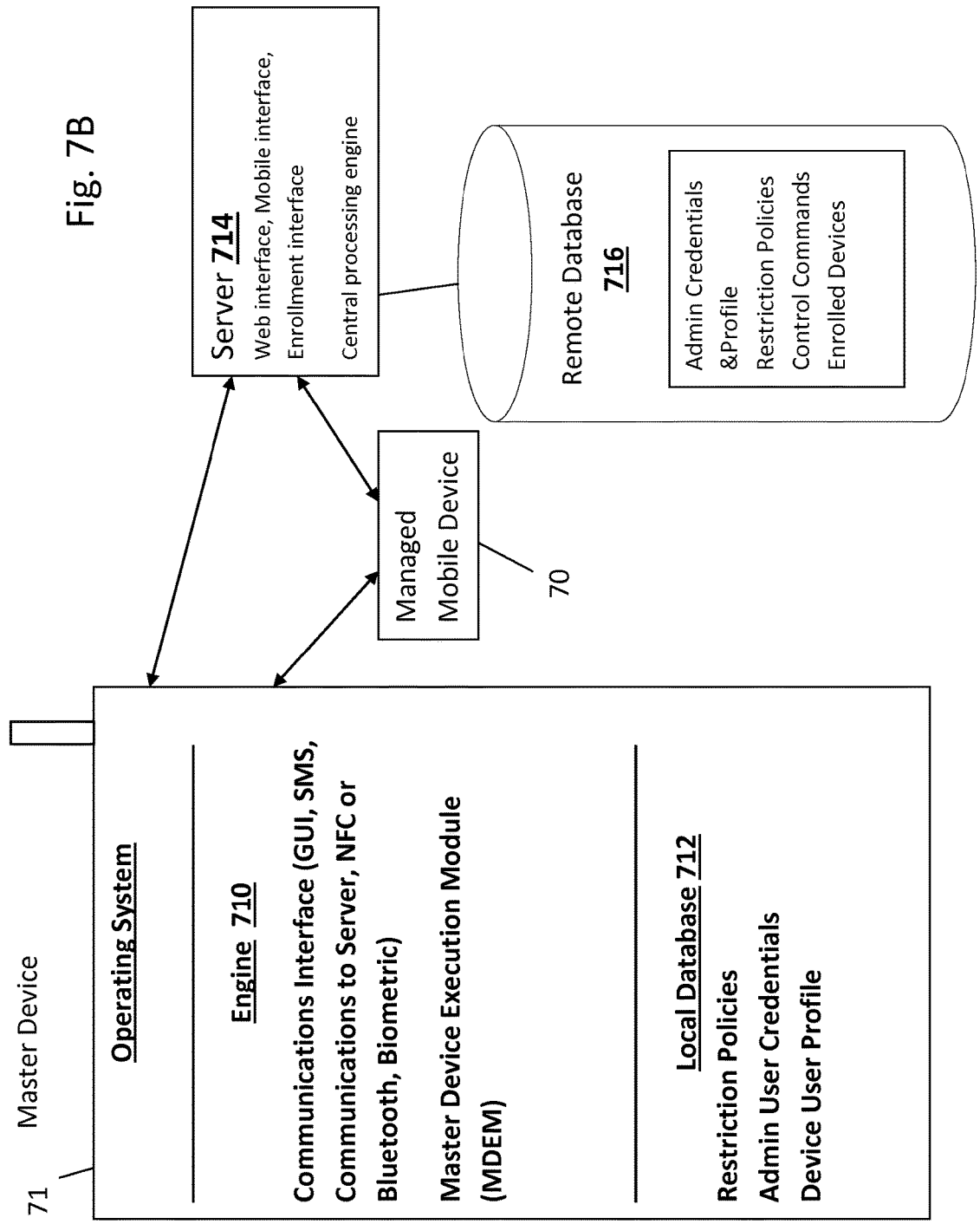

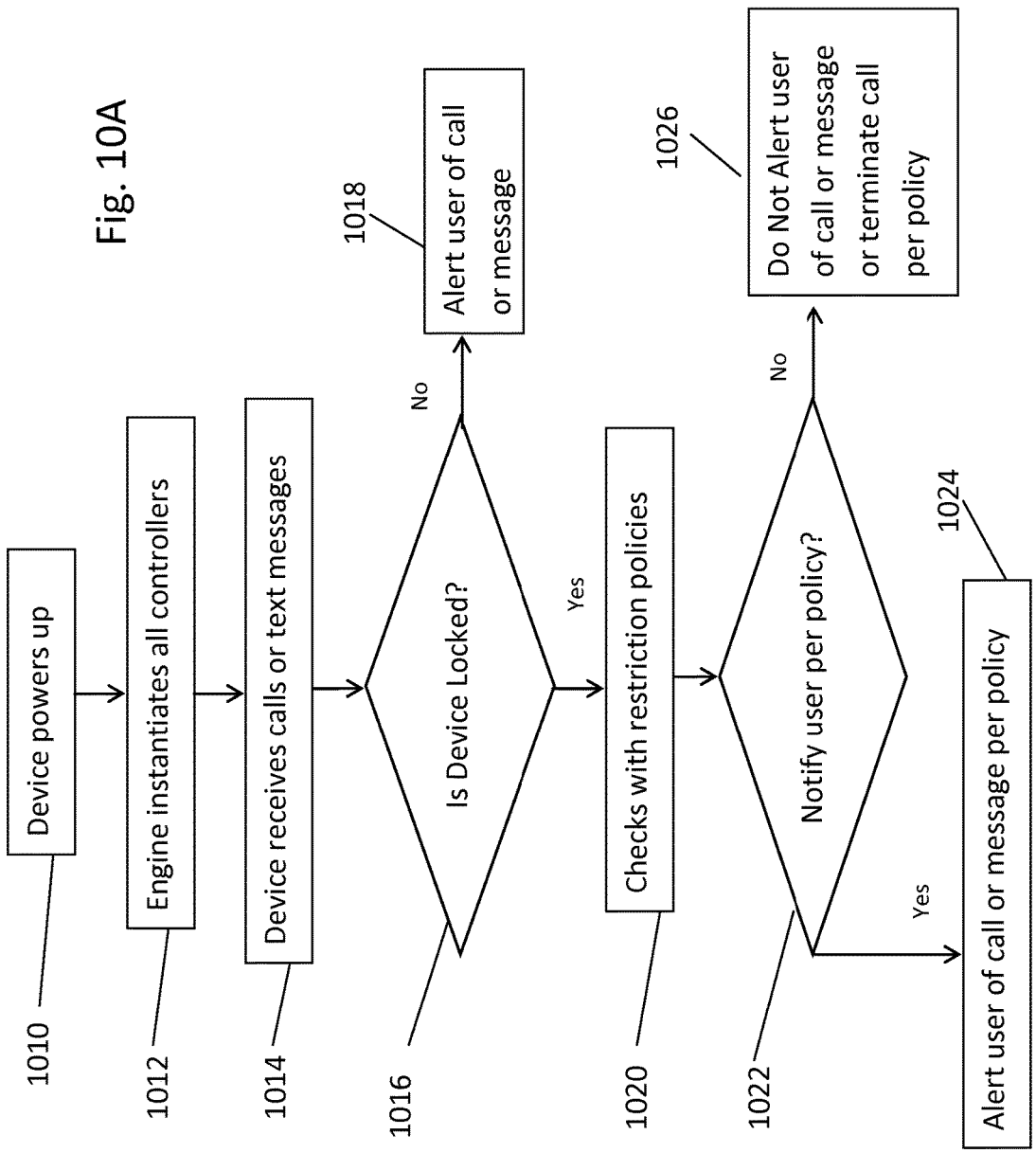

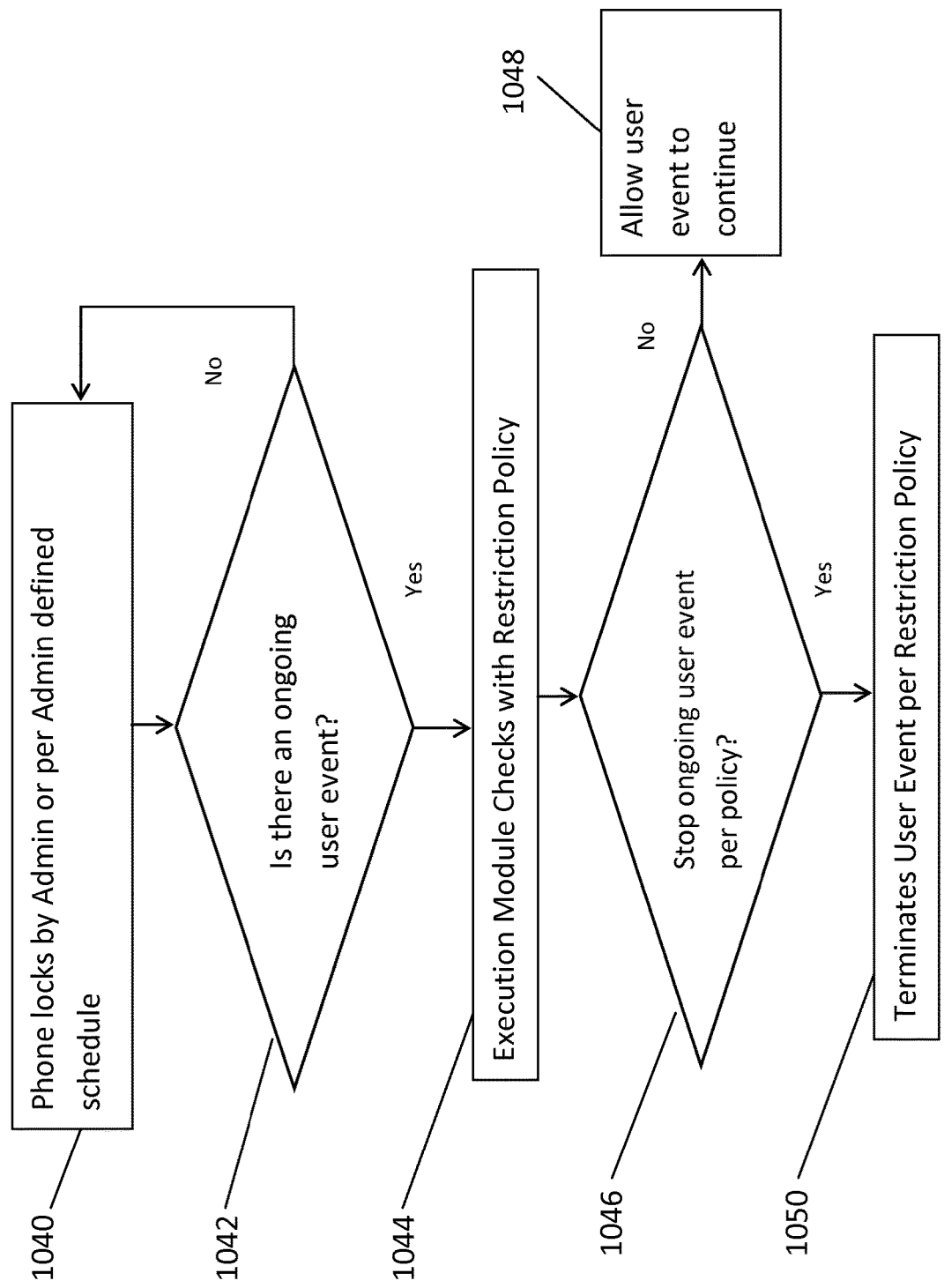

METHOD AND SYSTEM FOR MONITORING AND RESTRICTING USE OF MOBILE DEVICES

CROSS-REFERENCES TO RELATED APPLICATIONS

This application claims priority from U.S. Provisional Application No. 61/717,084 filed on Oct. 22, 2012 and U.S. Provisional Application No. 61/757,310, filed on Jan. 28, 2013, the disclosures of each of which are incorporated herein by reference in their entireties.

FIELD OF INVENTION

The invention relates generally to operation of mobile devices. Specifically, the invention relates to methods and systems for restricting and deterring unsafe or undesired usage of mobile devices.

BACKGROUND OF THE INVENTION

The advent of smart phones and other mobile computing devices has brought upon fundamental changes in the way people interact with each other and with their devices. People have become more connected and demanded more real-time communications regardless of their whereabouts. However, this new technology also gives rise to new and unpredictable human activities.

For example, the use of applications on mobile devices during times the user ought not to be using the applications has now become a serious, well-known problem. Use of applications on mobile devices at inappropriate times or for inappropriate lengths of time can distract users from prudent behavior. In an extreme situation, misuse of mobile devices can adversely affect the safety of the users themselves as well as the safety of the people in their surroundings.

For another example, use of mobile devices while driving can distract drivers and make them more prone to accidents. This safety problem affects a large number of drivers. According to the National Highway Traffic Safety Administration's 2008 survey, over 800,000 drivers on the road on any given day are actively using mobile devices and distracted driving played a factor in 16% of vehicle accidents. Studies indicate that crash risks may be increased as much as 23× when a driver is actively using a mobile device and that use may be as, if not more, distracting than driving while intoxicated or under the influence of drugs.

Given these grim statistics, and not surprisingly, parents are concerned when buying mobile devices for their children, and particularly, their teenagers. Many parents also worry that their children will use the devices during undesired times including school and late hours or during driving. Additional concerns include worries that children will abuse their calling privileges that would result in a higher phone bill, loss of the phone resulting in unauthorized access, or communicate with a stranger without their parents' knowledge or consent.

Similarly, employers can incur significant liability when their employees, during the course of employment, misuse their mobile devices and directly or indirectly cause the loss of properties or life. For example, a high speed train operator may engage in impermissible text messaging while negotiating a sharp turn and negligently causes the train to derail due to excessive speed around the turn. Employers may also want to control mobile device apps or features, such as a camera app in sensitive places to protect their trade secrets.

Therefore, parents and employers alike have the need and desire to manage the mobile devices under their control to prevent misuse of these devices.

U.S. Patent Publication No. 2013/0225151A1 discloses a mobile device parental controlling device which includes a communication interface for control communication with one or more associated devices of the controlling device, and the associated devices correspond to members of a group. A parental control service is implemented to receive an input of a device control via a parental control user interface, where the device control is initiated for one or more of the associated devices that are controllable by the controlling device. The parental control service can then initiate communication of the device control to the associated devices that are controlled by the controlling device.

U.S. Patent Publication No. 2013/0225152A1 discloses an automatically quieting mobile device which includes a communication interface for communicating with other devices that are associated with the mobile device, and the other devices correspond to respective users of the devices. A device quiet service is implemented to initiate a device quiet control that quiets one or more of the other associated devices that are controllable by the mobile device, and the device quiet service initiates communication of the device quiet control to the associated devices. A device quiet control can be initiated to restrict communication functions of the other associated devices, such as for a designated time duration. Alternatively or in addition, a device quiet control can quiet the other associated devices at a designated location, during an event, within a designated quiet zone, and/or quiet the associated devices that are proximate the mobile device at a location.

U.S. Pat. No. 7,899,438 discloses a system and method for the real-time management of a device, and more particularly to the establishment and enforcement of policies or rules associated with the feature or functions that may be performed with the device. The system comprises: (1) a policy decider for storing a list of policies that control one or more features or functions associated with the communication device and for automatically deciding to accept or deny a request sent to or from the communication device to perform the features or functions based on the list of policies, the list of policies including a policy for managing content that can be sent, received, or used by the communication device; and (2) a policy enforcer for communicating the request to the policy decider and enforcing a decision by the policy decider as to whether the request has been accepted or denied by either notifying the user of the denied request and taking one or more actions consistent with the denied request or taking one or more actions consistent with the accepted request.

However, none of these systems discloses or teaches a system that includes one or more of the following features: managing a mobile device by monitoring user events at the mobile device, allowing an administrator (or parent) to pre-select or pre-specify restriction policies at the managed mobile device, from a different device, or at a remote server, and which policies are synchronized across multiple devices managed by the administrator and the remote server and associated remote database. Furthermore, none of these systems provides any anti-tampering system to prevent user from circumventing the restriction policies placed on the mobile device.

Accordingly, there is a need for a new system and method which would enable parents, employers, or administrators to transparently manage usage of the various mobile devices so as to ensure usage of these devices complies with best practices or standards regardless of the operating systems of the managed mobile devices.

SUMMARY OF THE INVENTION

An object of the invention is to provide a robust and easy to set up system comprising a managed mobile device, a master device (operated by an administrator of the managed mobile device), and/or a remote server that would allow a parent or an employer to restrict the use of the mobile device based on a pre-determined schedule and/or policies. These restrictions may include complete blocking of certain or all functions of a managed mobile device on demand or at a particular time, enabling the control the parents or administrators need to ensure safety of their children or employees. The restriction policies may also include an administrator specified method of handling ongoing and future user events on a managed device as well as future communication events.

Another object of the invention is to prevent managed users from tampering with the inventive system on the managed mobile device on which predetermined schedule and/or policies are enforced.

In one embodiment the inventive anti-tampering method anticipates possible tampering actions a user may take against a specific restriction policy and commences a process to prevent the user from taking such actions. The anticipatory actions may include preventing the user from accessing or modifying device operational parameters, and/or launching specific application or process.

According to another embodiment of the inventive anti-tampering method is to monitor user events as they occur and when it is determined that a user event may negatively impact the enforcement of a restriction policy, a process is started to disrupt the user event to minimize the negative impact on the restriction policy and/or alert another party about the user event.

In another embodiment, there is provided a computer-implemented method and system for managing and restricting usage of a managed mobile device for: receiving by a remote server, a master device and/or the managed mobile device, a first administrator credential for identifying an administrator, and a restriction policy for restricting usage of the managed mobile device; storing in a database the administrator credential and the restriction policy; implementing a user events controller at the managed mobile device for monitoring and acting on a user event at the managed mobile device; and implementing an engine at the managed mobile device, the remote server, and/or the master device for enforcing the restriction policy, evaluating the user event and determining whether the user event prevents or disrupts enforcement of the restriction policy.

In still another embodiment, there is provided a computer-implemented method and system for managing and restricting usage of a managed mobile device, which comprises: receiving, by a server a first administrator credential for identifying an administrator and a restriction policy for restricting usage of the managed mobile device; storing in a database the first administrator credential and the restriction policy; and implementing an execution module at the server for enforcing the restriction policy.

Another object of the invention is to locally or remotely manage a mobile device via user specified schedules and restriction policies. This can be performed in conjunction with an operating system such as iOS (i.e. Apple Computer's mobile operating system), or any other smart phone operating system that can connect to a remote server and execute commands sent from a server (which also authenticates and registers user devices), including, but not limited to Android phones, Windows phones, and Blackberry phones etc. However, this invention is particularly important to iOS devices as currently there is no way to manage restriction policies on the device (including phone and tablets etc.) based on a pre-defined schedule, which restriction policies may include:

1. Totally block the access to the phone user interface (UI) with a Lock screen that requires a password or pin code, or other form of credentials (or shared secret) such as biometric data of a specified user to unlock.

2. Block certain features or functionalities such as, for example, web browser, camera, app store, install/delete apps, or certain types of contents such as, for example, music, video, apps and etc. based on ratings of these types of contents.

Still another object of the invention is to use non-blocking measures to help users make the right decision and which can tolerate GPS fault information and yet create sufficient deterrence so that non-blocking measures cannot be abused. Such non-blocking measures may include: (a) rendering a picture, video or audio that can impact or otherwise influence the behavior of users such as recordings from loved ones; (b) create output to a pre-defined list of recipients. The output may be email, text, social media updates etc. that notifies intended recipients of such attempts; and (c) create a lock screen that allows the user override by creating some forms of input, including pressing a designated button, a voice command and particular movement pattern, like shake the phone, etc. If users decide to ignore or override the non-blocking measures, a picture or a video or audio is taken and stored along with its location and timestamp. These overrides and associated information may be reviewed later on by the supervising user (e.g. the parent) to detect possible abuse.

According to an aspect of the invention, the system uses a variety of ways to collect user interactions by, for example, monitoring keywords entered into emails or chat programs, blogs and Tweet placements and other social network interactions.

In one embodiment, the inventive system allows an administrator to manage restriction policies on one or more target mobile communication devices (e.g, phone, tablet, phablets etc.) in a distributed manner, i.e., from one or more access or end points, including the target or managed device itself, or a different fixed or mobile device that is physically distinct from the managed device, or any device with a web browser. A restriction policy may restrict access to the device by activating a screen lock on the device and rendering a configurable content or text on the screen, and require how the device handles ongoing user events such as a call or the rendering of multimedia content, and how the device processes future user communication events such as incoming or outgoing call, text messages, multimedia-message service (MMS), emails, and peer to peer device connection etc. Restriction policies can be set up anywhere: in the managed device, master device or a remote server via different interfaces and can be synchronized among different devices or end points. A restriction policy may be executed from any device or end point (e.g., MMD, MD, Server) depending on target device or device operating system (OS) or administrator preference. In one embodiment, the restriction policies may be initiated or executed from the managed device, by an execution module (in the managed mobile device, master device, or the remote server) to put the device into different states based on the restriction policy.

In another embodiment, the execution is initiated from a remote server or a master device, by sending a command or a notification to retrieve the command, either directly or through a third party notification utility such as the Apple Push Notification Service (APNS) for iOS devices, or Google Cloud Messaging (GCM) for Android devices. The command can be executed either directly by the device operating system (OS), or by a downloadable software application or a pre-installed software application. To ensure that the restriction policy is executed properly, which is critical to today's smart phone or mobile device environment, a User Event Controller is utilized to monitor user events and user related system events, to prevent the user from tampering with the enforcement of the restriction policy, and take appropriate actions to put the device in a state consistent with currently active or effective restriction policy, and/or alert the administrator user concerning such user events.

In another embodiment, the device management process comprises enrollment or registration of user credentials and, optionally, device identifiers, set up or creation of restriction policies for the managed devices, and execution of the restriction policies on the managed devices. The information including the administrator user credentials, device identifiers and policies may be stored locally at a device and/or at a remote database, provided that the various local and remote databases are synchronized with the most current or updated restriction policies.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DESCRIPTION OF THE DRAWINGS

In the drawings:

FIG. 7B depicts a Master Device according to an embodiment of the invention;

FIG. 10A is a flowchart of an exemplary operation of the system when the Managed Mobile Device receives a message or call;

FIG. 10B illustrates an exemplary operation of the system when the Managed Mobile Device is locked and the Managed Mobile Device has an ongoing call;

DETAILED DESCRIPTION OF THE PRESENTLY PREFERRED EMBODIMENTS

Figure 7A:
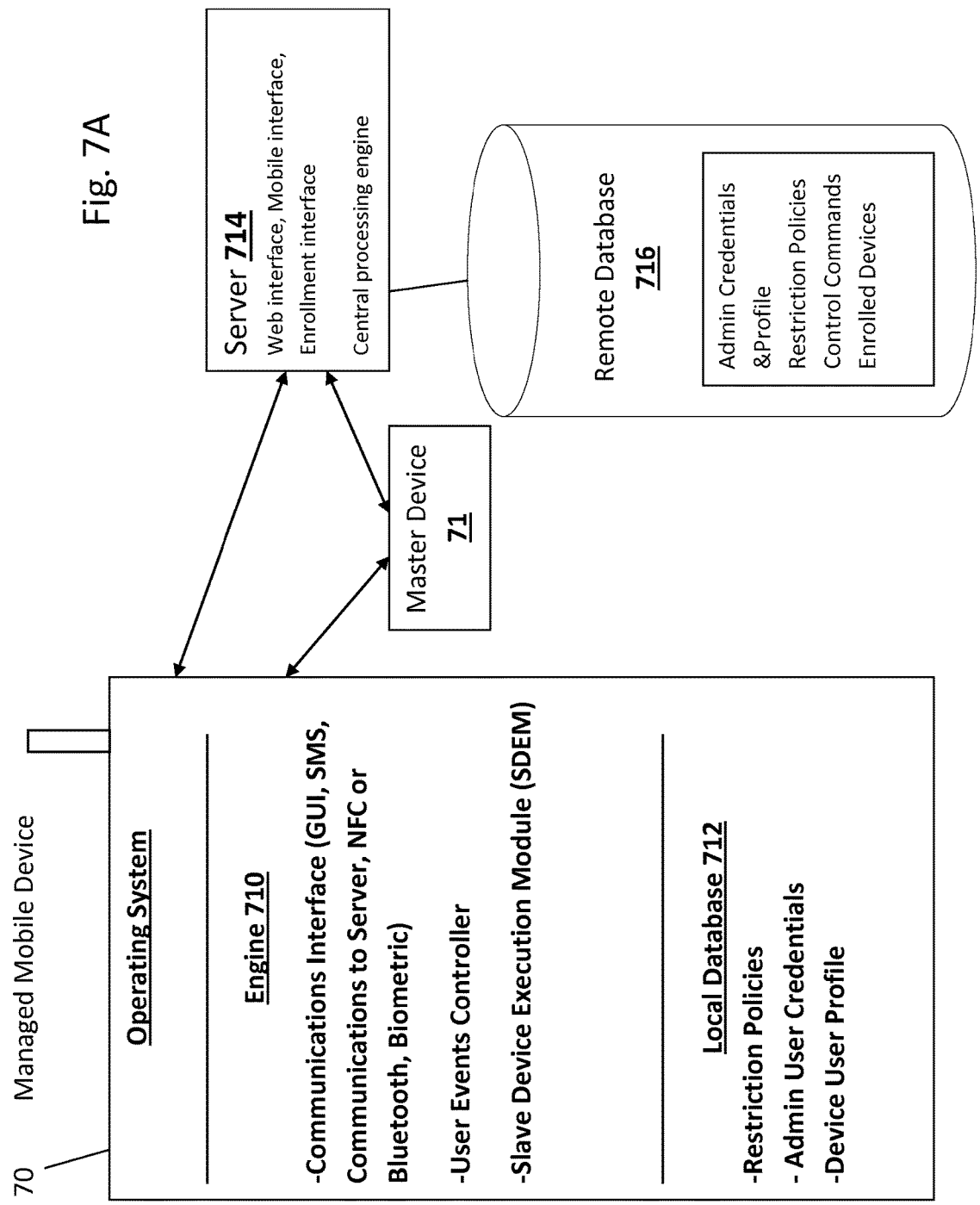
FIG. 7A illustrates a Managed Mobile Device according to an embodiment of the invention.

FIG. 7A diagrammatically illustrates a presently preferred embodiment of the inventive system comprising a Managed Mobile Device (MMD) 70 (e.g., a Windows phone, an Android phone, an iPhone, an iPad, or an Android a tablet), a Master Device (MD) 71 (e.g., a Windows phone, an Android phone, an iPhone, an iPad, an Android a tablet, a laptop, or a desktop computer), a remote Server ("Server") 714 with a remote database (DB) 716 in operable communication with the Managed Mobile Device 70 and the Master Device 71.

The MD 71 and MMD 70, each of which has the typical hardware such as a central processing unit (CPU), EEPROM, and persistent memory devices (e.g. solid state drives (SSDs)), and preferably includes an antenna and configured to include wireless interfaces such as WiFi or a cellular network interface.

The Server 714 may comprise one or more server computers or be optionally hosted on a cloud computer infrastructure, constructed with hardware including a central processing unit (CPU), an EEPROM, a motherboard, a high speed data bus, a persistent memory device (e.g., a hard drive or SSD), and is configured to include (i) a communication interface that comprises an Enrollment Interface, a Mobile interface, and a Web Interface, and (ii) a central processing engine (including an execution module) for executing tasks such as, for example, processing enrollment or registration data from users, synchronizing and coordinating with data to and from the MMDs 70 and MD 71, and enforcing restriction policies by, for example, (1) totally blocking access to the phone user interface (UI) with a Lock screen that requires a password or pin code, or other form of credentials (or shared secret) such as biometric data of a specified user to unlock or (2) partially blocking certain features or functionalities such as, for example, web browser, camera, app store, install/delete apps, or certain types of contents such as, for example, music, video, apps and etc. based on ratings of these types of contents. The Web Interface is configured to allow the Server 714 to communicate with the MMD 70 and the MD 71 via communication protocols like Internet Protocol or Wireless Application Protocol (WAP) etc. The Mobile Interface is configured to communicate with the MMD 70 and MD 71 via communications networks, include both wireless WAN (wide area network) or wireless local area network (LAN) and fixed line internet. Through the Mobile or Web Interface, the Server 714 is able to receive from an administrator the administrator's credentials and profile information necessary for subsequent authentication of the administrator by the Server 714, and for allowing the administrator to enroll the MMDs 70 under the administrator's control. The administrator can configure or set up restriction policies governing the use of the MMDs 70 using the Mobile or Web interface. The administrator can optionally add one or more other administrators with different credentials and different roles with different level of access privileges.

The Remote Database stores the Administrator's credentials and profile information, restriction policies, control commands (e.g. SMS messages) for controlling the operation of the MMDS 70, and a list of attributes of the MMDs 70.

The local database of the MMD 70 includes the device user profile and restriction policies that were either set up locally or received from the Server 714. It also includes the administrator's user credentials and profile information to allow the administrator to directly set up, create, or adjust restriction policies on the MMD 70 rather than remotely via the Server 714 or MD 71.

The MMD 70 includes an Engine 710 comprising a Communications Interface, a User Events Controller, a Slave Device Execution Module (SDEM), and a local database including restriction policies, an administrator's credentials and profile information, and the profile of the MMD (e.g. device identifier).

The Slave Device Execution Module (SDEM) coordinates with all modules and local database installed on the MMD and executes actions in accordance with the restriction policies.

The Communications Interface is configured to allow the Administrator to control the various functions of the MMD 70 and to allow MMD 70 to communicate with the Server 714 or MD 71, and includes a graphic user interface (GUI), a Short Messaging Service (SMS) interface for communicating SMS messages, Communications Interface to Server (CIS) (e.g. HTTP, HTTPS, SOAP, RESTful interface), a Near Field Communication (NFC) interface (which allows mobile devices to establish radio communication with each other via contact with each other or by bringing them into close proximity), BlueTooth interface (which allows exchange of data over short distances between devices using short-wavelength radio transmissions in the ISM band from 2400-2480 MHz), and/or a biometric interface for receiving physiological identifier(s) of a user for authenticating the identity of an administrator.

Figure 7C:
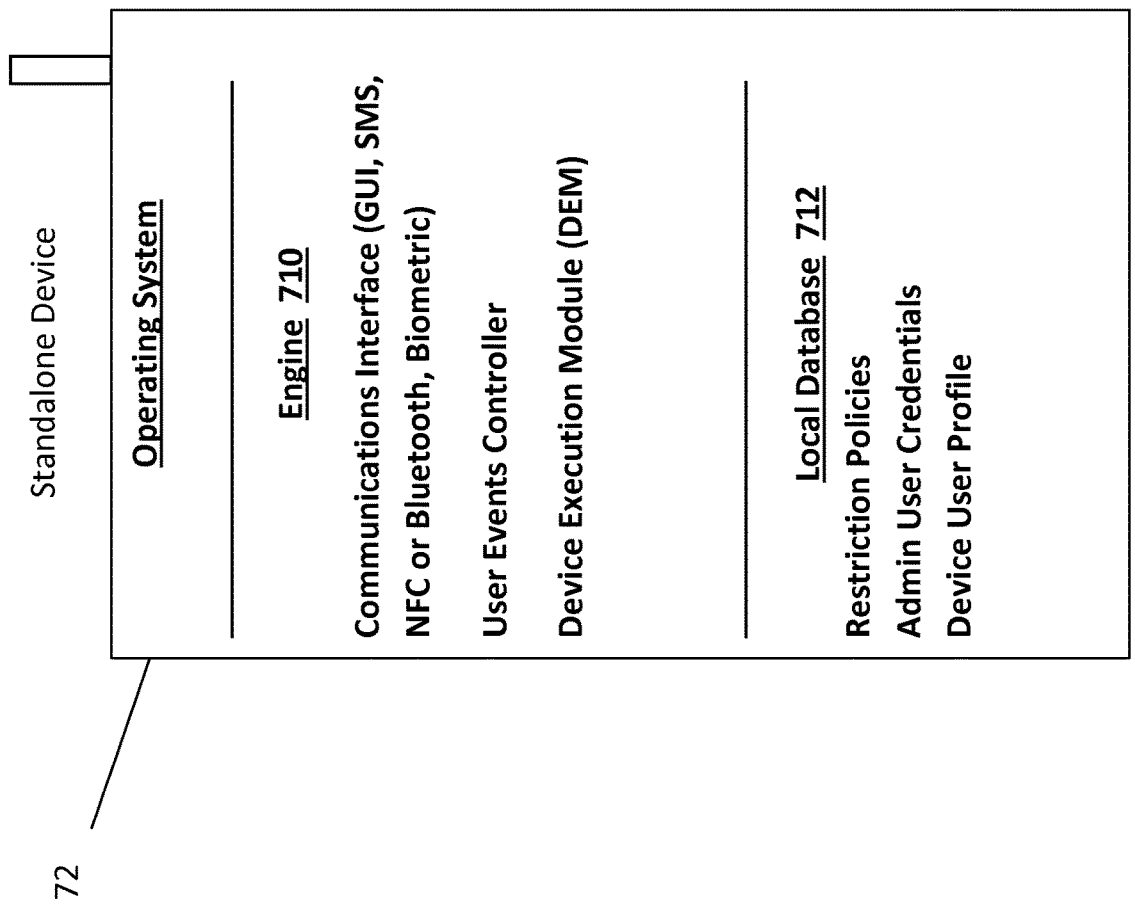
FIG. 7C depicts a standalone managed mobile device (without a master device or a remote server) according to another embodiment of the invention.

FIG. 7C shows a standalone managed mobile device (SMMD) 72 comprising an Engine 710 that includes: (a) Communications Interface (including GUI, SMS, NFC or Bluetooth, and Biometric etc.), (b) User Events Controller (UEC), and (c) Device Execution Module (DEM); and a Local Database (DB) that includes (a) Restriction Policies, (b) Admin User Credentials, and, optionally, (c) Device User Profile. The Communications Interface includes a graphical user interface (GUI) for the administrator user to set up his credentials and the desired restriction policies for the managed mobile device and preferably a mobile interface (e.g., short messaging service (SMS)) to allow for communications (e.g., alerts) between the managed mobile device and a peer mobile device of a peer user or the administrator user. The UEC, the DEM, and the Local DB 712 of this SMMD operates substantially the same as the embodiments of FIGS. 7A and 7B with respect to the enforcement of the restriction policies.

Figure 8:
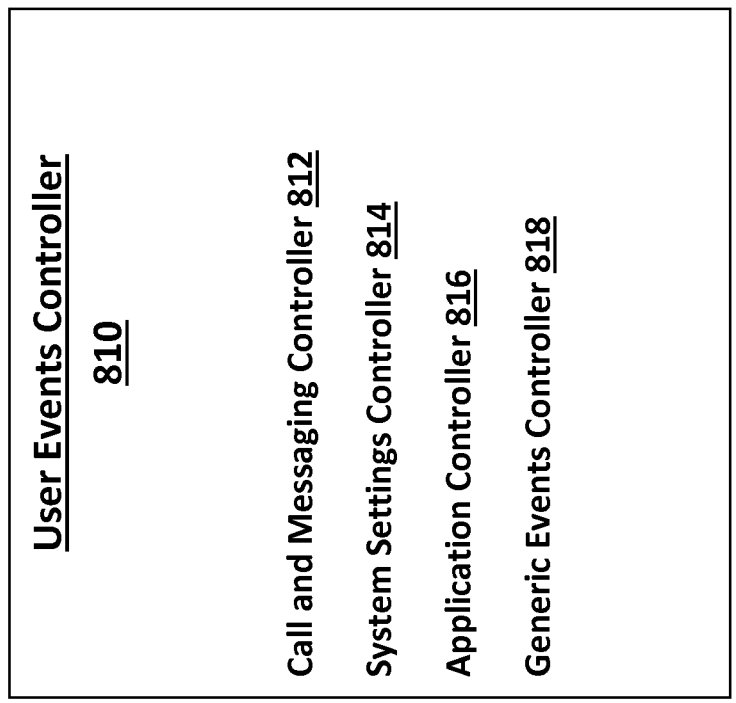
FIG. 8 illustrates an embodiment of the User Events Controller.

As shown in FIG. 8, the User Events Controller (UEC) 810 is configured to monitor and manage overall user events such as, for example, usage of resources of the managed mobile device or changes to the managed mobile device environment. The UEC preferably includes a Call and Messaging Controller (CMC) 812, a system settings controller (SSC) 814, an application controller (AC) 816, and a generic events controller (GEC) 818. A user event is a direct or indirect action or input initiated or triggered by a user of the MMD 70 or by another user of a different device in operable communication with the MMD 70. For example, a user event may, for example, be a call, a text message, or a launching or instantiating a software application.

The Call and Messaging Controller (CMC) 812 detects incoming/outgoing calls and text messages, MMS, and emails etc. The UEC 810 may, through user interaction system or the device OS, find out who is the recipient or initiator of the call or text message, intercept and/or render the contents of the text messages, terminate the call, hide the text message or prevent the user from picking up the call or responding to the call or text messages. The UEC 810 can also initiate a call or text to another party such as the administrator or his designated recipient of such call or text message.

The system settings controller (SSC) 814 monitors the system settings of the MMD 70, which includes but not limited to: location services settings, security settings, date and time settings, device specific settings including hardware and software, user interface (UI) and display settings, network settings, sound profile settings, account and privacy settings etc. The SSC 814 is configured to detect any changes or attempted changes on any of the device system settings or operation parameters according to the restriction policy set up by the administrator, and it is also able to change the settings/parameters or present an interface or send an alert to the user regarding a change to the settings, or prevent the user from changing the settings/parameters.

The application controller (AC) 816 is configured to control how a particular application operates and detects events related to the life cycle of any particular application that is either downloaded to or pre-installed in the MMD 70, including events such as the start (or instantiation), stop (or termination), upgrade, uninstall and aggregate usage time or pattern over any desired period of time. The AC 816 may also detect or make changes to the application settings. In the event of a phone lock actuated (or caused) by the execution of a restriction policy, the user may want to circumvent the inventive system by using certain applications such as a task manager application to stop our application from running and thus circumvent the phone lock activated by the inventive system. In such event, the AC 816 is configured to detect the launch or installation of such application and report to the SDEM so that the SDEM may employ countermeasures such that a user can't continue using such application to terminate our application (i.e., the inventive system).

The generic events controller (GEC) 818 handles other events related to the user such as device power on/off, screen on/off, voice or biometric data input event, key press, screen touch event, and accelerometer output (relating to device movement) etc. A user make try to power cycle the MMD 70 to circumvent the phone lock; the GEC 818 will detect such events and handle it appropriately so that the phone lock stays engaged according to the administrator's restriction policy.

Figure 9:
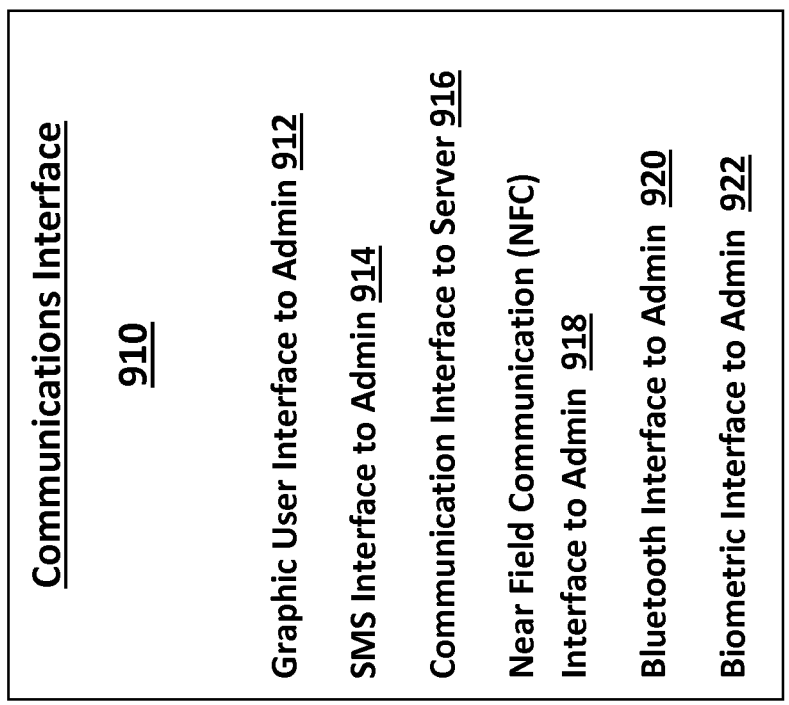
FIG. 9 is an exemplary Control Interface of the invention.

FIG. 9 illustrates an embodiment of a Communications Interface (CI) 910. The CI 910 is the management interface at the managed device to the administrator and to the Server 714. The CI 910 is configured to: authenticate the administrator, allow the administrator to set up MMD 70 user credentials, enroll the MMD 70 and MD 71 to the Server 714, receive input from the administrator directly or indirectly from the Server 714 to set up security or restriction policies or execute a command, send responses or feedback directly to the administrator or to the Server 714 about the status, progress or results of execution of one or more restriction policies. The CI 910 includes: a graphic user interface to Administrator (GUIA) 912, SMS interface to Administrator (SMSA) 914, Communications Interface to Server (CIS) 916, and optionally NFC Interface to Administrator (NFCA) 918 or Bluetooth Interface to Administrator (NBIA) 920, and biometric interface to Administrator (BIA) 922. They are described as follows.

The GUIA 912 is the main user interface to administrator at the MMD 70. It is configured to allow the administrator to: (a) set up administrator user credentials, including a user account, a security credential such as a password, a certificate (for mobile device operating system such as iOS which contains profile information of the administrator), an administrator phone number, and/or biometric data via the BIA 922; (b) log into the GUIA 912; (c) enroll the MMD 70 to the Server 714; and (d) set up one or more restriction policies or to modify existing security or restriction policies at the MMD 70.

The SMSA 914 is configured to accept commands from the administrator in the form of special text messages (e.g. SMS) from authenticated phone numbers, and pass these commands to the SDEM to execute. The SMSA 914 can also transmit or send command response and phone lock related alerts to the administrator. These alerts can be highly relevant to the reliable execution of the restriction policy such as when a new app is installed on the managed device. (For example, if the administrator receives an alert that a task killer is installed, he may decide to block the task killer application from running).

The CIS 916 is configured to communicate with the Server (via, for example, RESTful interface, HTTPS) in a secure manner to: (a) send the user credential to the server; (b) enroll the MMD 70 to the Server 714, by transmitting or sending over device identifiers and user security credentials and optionally, restriction policies set up by the administrator locally at the MMD 70; (c) receive notifications from the Server 714, either directly or through a third party utility application, to connect to the Server to retrieve commands or directly receive command(s) from the Server 714 or the MD 71. The command(s) may include change of security credential, set up, change, or execute restriction policies etc. such as that shown in FIG. 6.

The administrator may enroll or register his mobile devices by one of several alternatives: (1) the administrator may sign up and log into the Server via his web browser at a fixed device (e.g. a desktop) and follow the online forms presented by the Server and input the requested information including his login identifier (e.g. his email address) and credentials (e.g. a shared secret such as a password, or biometric data), the device identifiers of his Master Device 71 and Managed Mobile Devices 70 (e.g., IMEI of each device), characteristics of the mobile devices (e.g. brand and model number of each device), and set up a new restriction policy or select from a set of available restriction policies (e.g., a time schedule for locking one or more of the enrolled MMDs 70) offered by the Server; or (2) the administrator may download and install a client software application onto his device and instantiates the Engine 710 and Local Database 712. Once installed, the Engine 710 will present to the administrator an enrollment or registration form similar to that rendered by the Server 714 for the administrator to enter his credentials, information relating to his MD 71 and MMDs 70, and to select restriction policies for each of his registered MMDs 70. The entered information is communicated to the Server 714 and which then stores the received information in the Remote Database 716. Each MMD 70 will require installation of a client software application that would enable the MMD 70 to communicate with the Server 714. Depending on the operating system (e.g., iOS, Android or Windows) running on the MMD 70, the client application may allow the MMD 70 to have a Local Database 712 that includes restriction policies and an Engine 710 that implements such restriction policies when triggered by events (e.g., a phone call while driving, a scheduled time, or the MMD 70 in a school zone). Optionally, if the MMD does 70 not allow installation of such client application, a client application with reduced functionalities would be installed such that the MMD 70 will communicate with the Server 714 upon occurrence of a user event and the Server 714 will interpret the user event and the applicable restriction policy. Implementation of the applicable restriction policy will be carried out by the Server 714 by sending out the required command in the form of, for example, an SMS message to the MMD 70 or a notification through a $3^{rd}$ party utility such as APNS for iOS devices and GCM for Android devices. Upon receipt and authentication of the SMS containing the command, the MMD 70 operating system executes the command, resulting in the desired behavior (e.g., locking the phone, rendering an alert to the user, and sending a confirmation back to the Server 714).

Restriction Policies. A restriction policy may restrict access to the device by activating a screen lock on the device and rendering a configurable content or text on the screen, and how device handles ongoing user events such as a call or the rendering of multimedia content, and how the device processes future communication events such as incoming or outgoing call, text messages, multimedia-message service (MMS) messages, emails, and peer to peer device connection etc. Restriction policies can be set up anywhere: at the managed device, master device or a remote server via different interfaces and can be synchronized among different devices or end points. Device specific restriction policies may be synchronized by associating a managed device with an identifier, and assigning or associating one or more restriction policies with the device identifier. A restriction policy can be executed from any device or end point depending on target device or device operating system (OS) or administrator preference. In one embodiment, the restriction policies may be initiated from the managed device, by an execution module to put the device into different states (e.g., a Lock state) based on the restriction policy. In another embodiment, the execution is initiated from a remote server, by sending a command or a notification to retrieve the command, either directly or through a 3rd party notification utility such as the Apple Push Notification Service (APNS) for iOS devices, or Google Cloud Messaging (GCM) for Android devices. The command can be executed either directly by the device operating system (OS), or by a downloaded software application or a pre-installed software application. To ensure that the restriction policy is executed properly, which is critical to today's real world smart phone or mobile device environment, a User Event Controller is utilized to monitor user events and user related system events, to prevent the user from tampering with the restriction policy enforcement, and take appropriate actions to put the device in a state consistent with currently active restriction policy (one more restriction policy can be set up for a device), and/or alert the administrator about the user events.

FIG. 10A illustrates an exemplary operation of the inventive system. The MMD 70 powers up in Step 1010. The Engine 710 then instantiates all of the local components of the inventive Engine 710 including the User Events Controller 810 in Step 1012. The MMD 70 receives a call or a text message in Step 1014. The Engine 710 determines if the MMD 70 is locked in Step 1016. If MMD 70 is not locked then the Engine 710, via the SDEM, alerts or allows the user to be notified of the call or text message 1018. If MMD 70 is locked, then the Engine 710 interprets or checks with the restriction policies at the Local Database 712 or the Remote Database 716 (depending on the configuration of the MMD 70) to determine whether to alert the user in Step 1020. The Engine 710 determines if the user should be notified per the restriction policy at step 1022. If the applicable restriction policy permits user notification, then the Engine 710 alerts the user of the incoming call or text message in Step 1024. If not, the Engine 710 may terminate, block, or otherwise cause the MMD not to alert the user in Step 1026.

FIG. 10B illustrates another use scenario pursuant to the inventive system. In Step 1040, the MMD 710 is locked by the administrator either on-demand or pursuant to the administrator's defined schedule. In Step 1042, the Engine 710 determines if there is an ongoing user event (e.g., a call or rendering of multimedia such as music or video) in this locked state. If there is an ongoing call, the Engine 710 via the SDEM checks with the applicable restriction policies stored either locally (at the Local Database 712) or remotely (at the Remote Database 716) in Step 1044. In Step 1046, the Engine 710 determines whether to stop the ongoing user event per the applicable restriction policy. In Step 1048, if the applicable restriction policy allows the ongoing call to continue, the Engine 710 does not take further action with respect to this ongoing user event (e.g., call or rendering of multimedia content). If the restriction policy requires termination of an ongoing user event (e.g., a call or rendering of multimedia content), then the Engine 710 via the SDEM terminates the ongoing call in Step 1050.

Figure 10C:
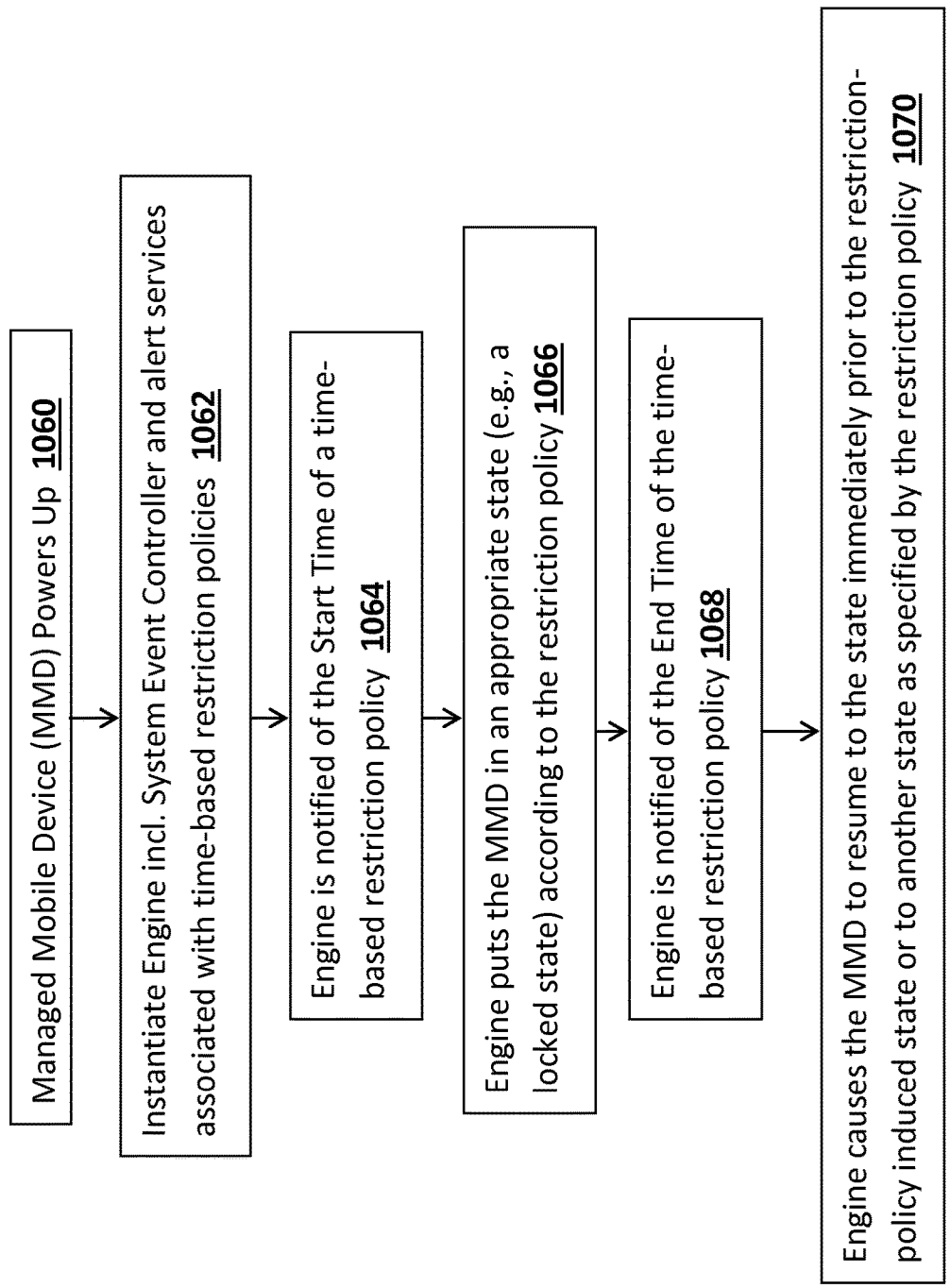
FIG. 10C illustrates an exemplary operation of the inventive system when a schedule-based restriction policy is implemented at a Managed Mobile Device.

In another use scenario, as illustrated in FIG. 10C, upon device power up (Step 1060), the Engine 710 initiates all controllers of the System Events Controller 810 and all alarms/alert services associated with the execution of a restriction policy that is time-based or schedule-based (Step 1062). The Engine 710 is notified at the start time of the schedule-based restriction policy (1064). The Engine 710 then puts the MMD 70 in an appropriate state (e.g., a locked state) according to the policy (Step 1066). At the end of the scheduled lock time, the Engine is notified of the end time of the scheduled lock state (Step 1068). The Engine 710 then causes the MMD 70 to resume to the state immediately prior to the restriction-policy induced state or to another state as specified by the restriction policy (Step 1070).

Device Usage while Driving

Figure 1:
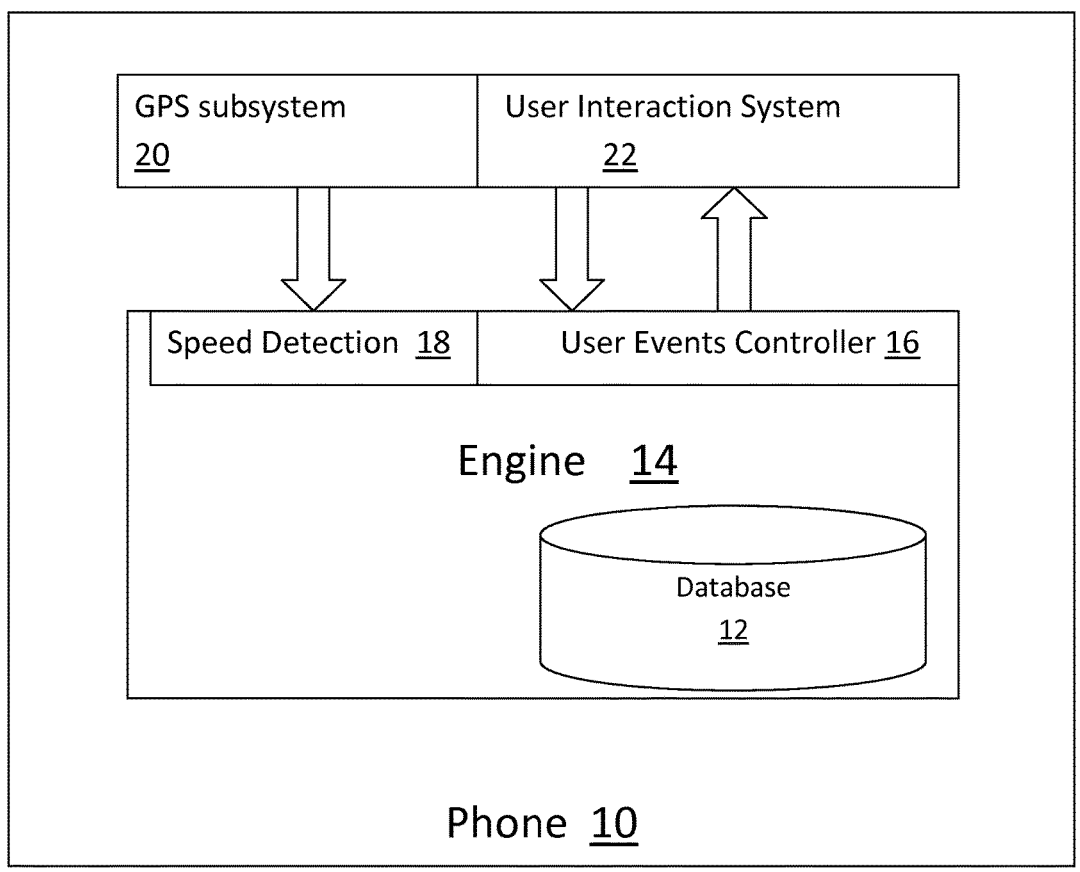
FIG. 1 is a schematic diagram of a mobile device comprising an embodiment of the present inventive system.

FIG. 1 depicts a phone device configured according to an embodiment of the inventive system, which comprises a Global Positioning System (GPS) subsystem 20, a User Interaction System 22, an engine 14 including a speed detection module 18 and a user events controller 16, and a database 12. The GPS subsystem 20 transmits global positioning signals to the speed detection module 18. The User Events Controller 16 communicates with the User Interaction System 22 to monitor and control user events such as, for example, texting and voice calls.

Figure 2:
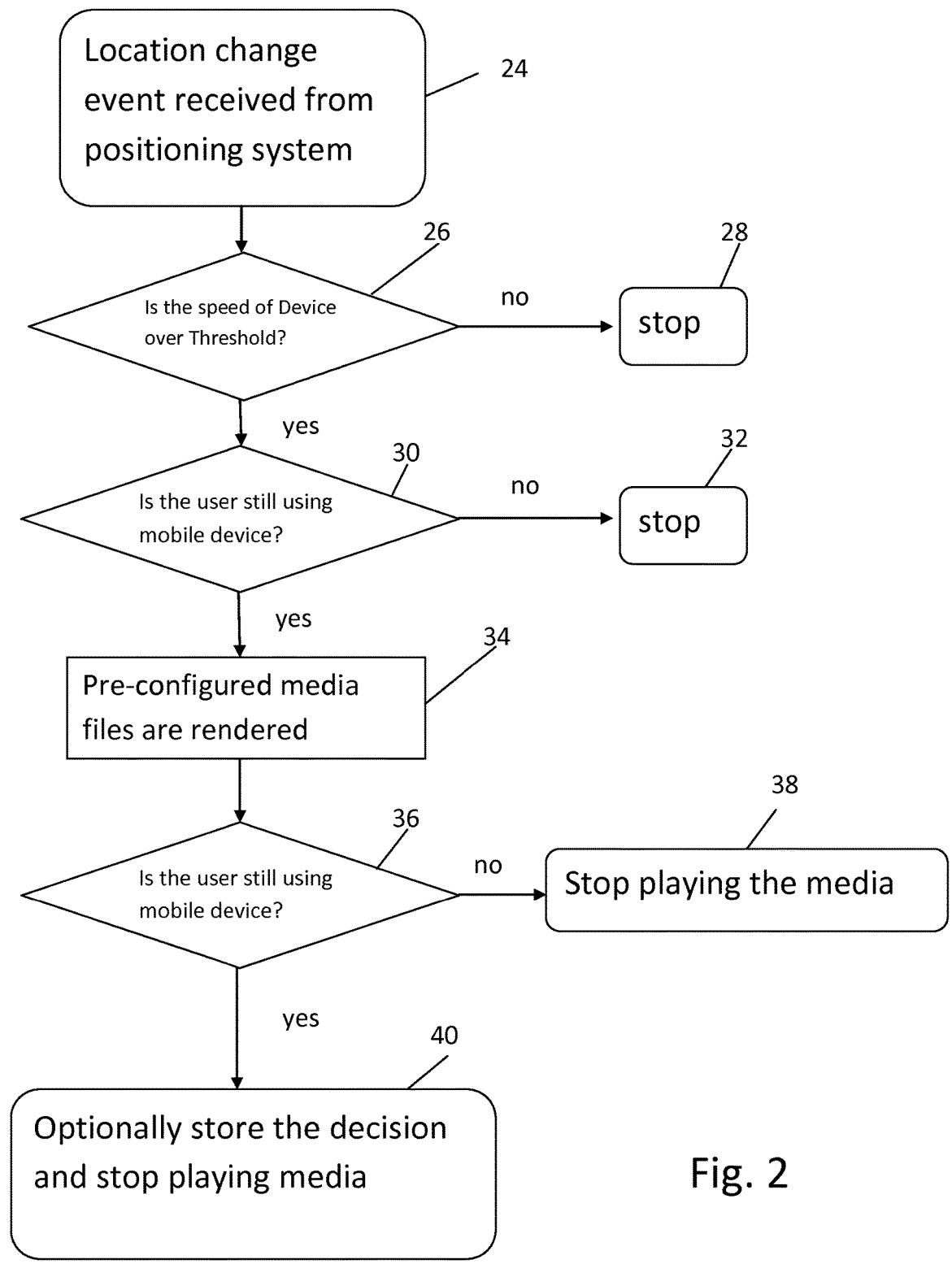
FIG. 2 is a flowchart of an embodiment of the protective measure in accordance with the present invention.

In FIG. 2, the system receives the location change event received from the GPS subsystem (Step 24) and determines whether the speed of the mobile device exceeds a predetermined threshold (Step 26). If not, the system does nothing (Step 28). But if the threshold is exceeded, the system proceeds to analyze if the user is using the mobile device by checking if the user is generating certain events such as pressing the phone button, flipping open the phone, or turning on the phone screen, or touching the screen etc. (Step 30). If the user is not using the device, the system does nothing (Step 32). However, if the user is using the device, one or more pre-configured multi-media files are rendered to warn, alert or otherwise notify the user (Step 34). If the user stops using the mobile device (Step 36), then the system stops rendering the multi-media files (Step 38). If the system determines that the user is still using the device (Step 37), the mobile device stores or records the then-existing states of the device and/or the system's analytical results indicating of the user's decision to continue usage of the device (Step 40).

Figure 3:
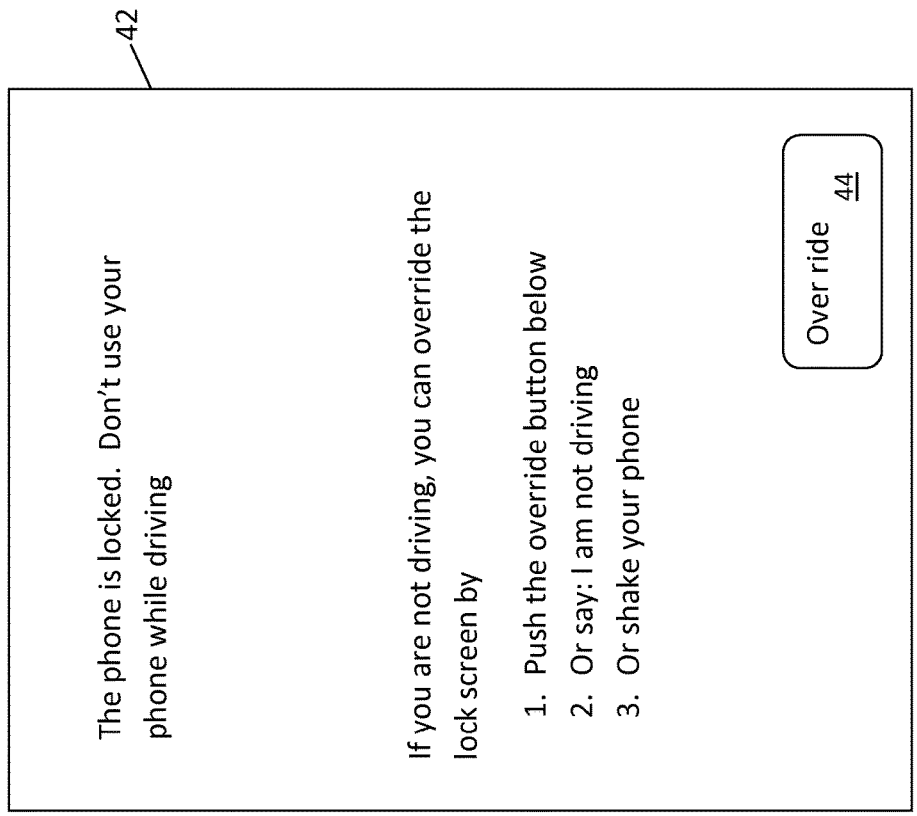
FIG. 3 illustrates a sample lock screen when the speed of a mobile device exceeds a predefined threshold.

FIG. 3 illustrates a screenshot of an exemplary screen lock 42 preventing continuing usage of the phone as implemented by the system in accordance with the present invention. It is noted that the screen lock 42 provides an option for manual override 44 by the user. This feature enables the user to override the system in the event the system made an erroneous determination as to the speed of the mobile device due to, for example, erroneous signals from the Global Positioning System (GPS) subsystem. An advantage of this system-induced interruption or a series of interruptions, even though overrideable, in phone usage could prompt the user to rethink his unsafe behavior (e.g. texting while driving).

Figure 4:
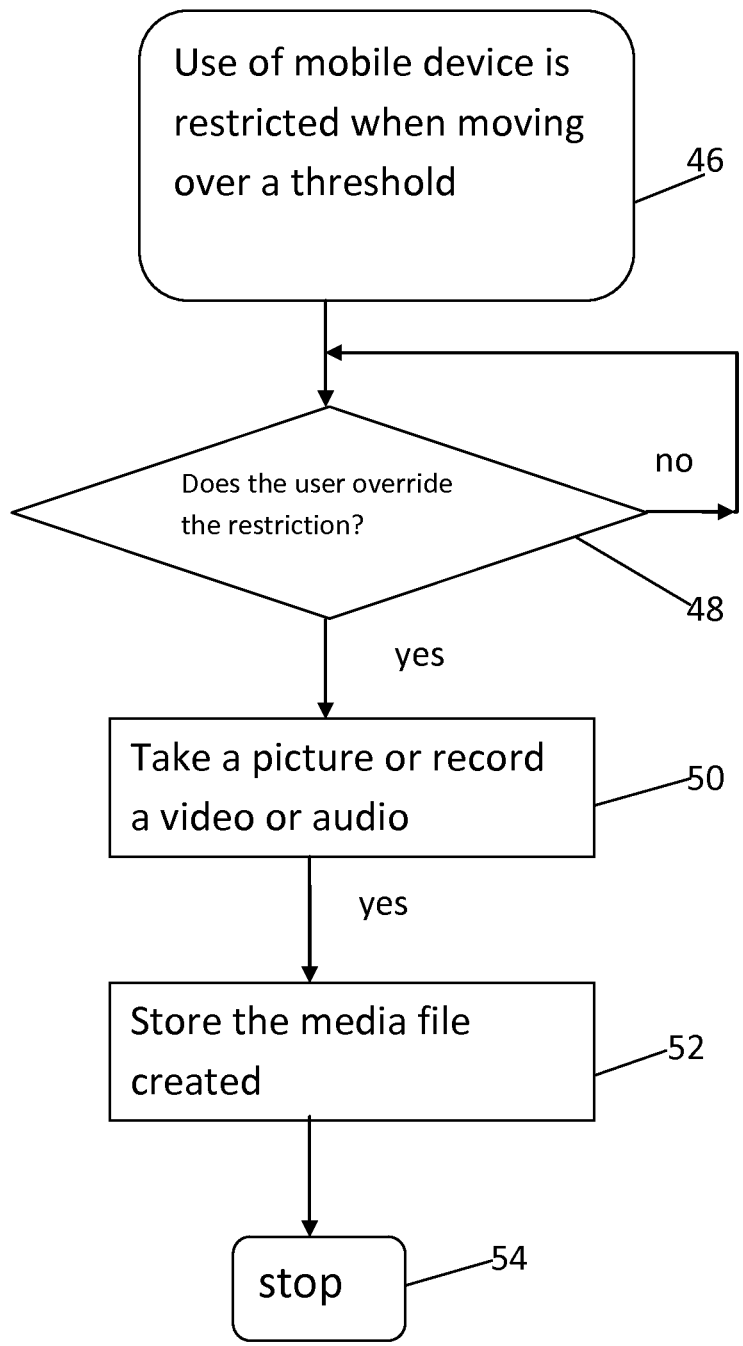
FIG. 4 depicts an exemplary method of overriding a restriction on use of a mobile device.

FIG. 4 is a flowchart further illustrates the system override process. Initially, the use of the device is restricted when the device speed exceeds a threshold (Step 46). Next, the system determines if the user has overridden the system-induced restriction (Step 48). If not, the system continues to monitor user overrides. If the user overrides the restriction, the system may take one or more still images and/or record the user activities via the phone's microphone and/or camera in a multi-media file for later review by the supervising user (Step 50). The media file is then stored either on the phone or transmitted to a remote server for access by the supervising user (Step 52).

Figure 5:
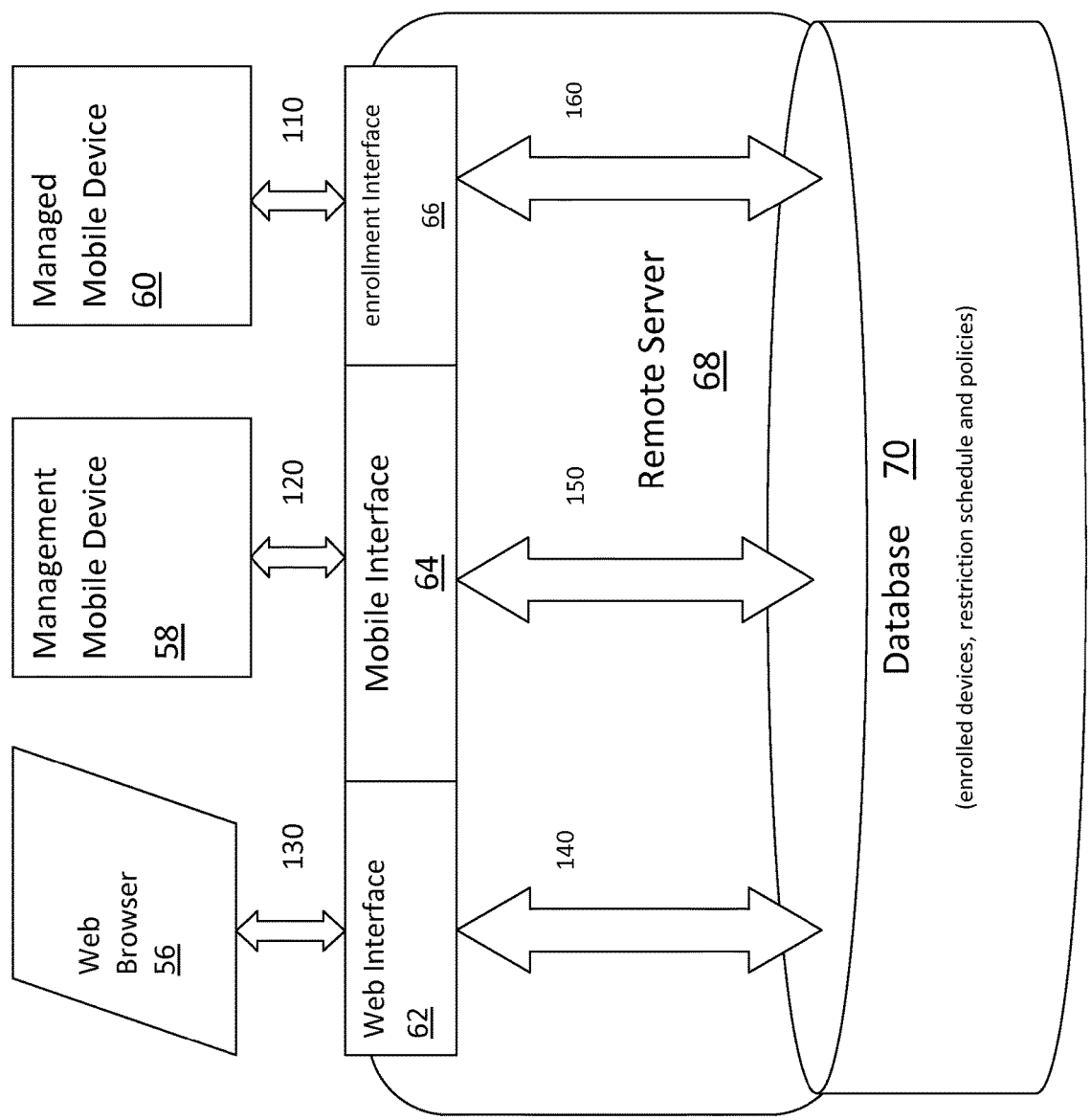
FIG. 5 diagrammatically depicts a system comprising mobile devices, a remote server, and a database operating according to an embodiment of the invention method for service enrollment, restriction scheduling, and policy management.

FIG. 5 depicts a system that employs a remote server 68 to interface with the user mobile devices 58, 60 and for user registrations. A database 70 is preferably configured to store information relating to the enrolled devices, restriction schedule and use policies. This system is particularly advantageous for devices whose operating systems do not allow third party applications to access controls of the device. Using the remote server 68 in this environment, the supervising user may remotely implement restriction schedules for limiting the use of one or more of the enrolled devices. It is contemplated that the remote server 68 may transmit information to the supervising user any data concerning violations of the restriction policies in real time or for later retrieval by the supervising user.

Figure 6:
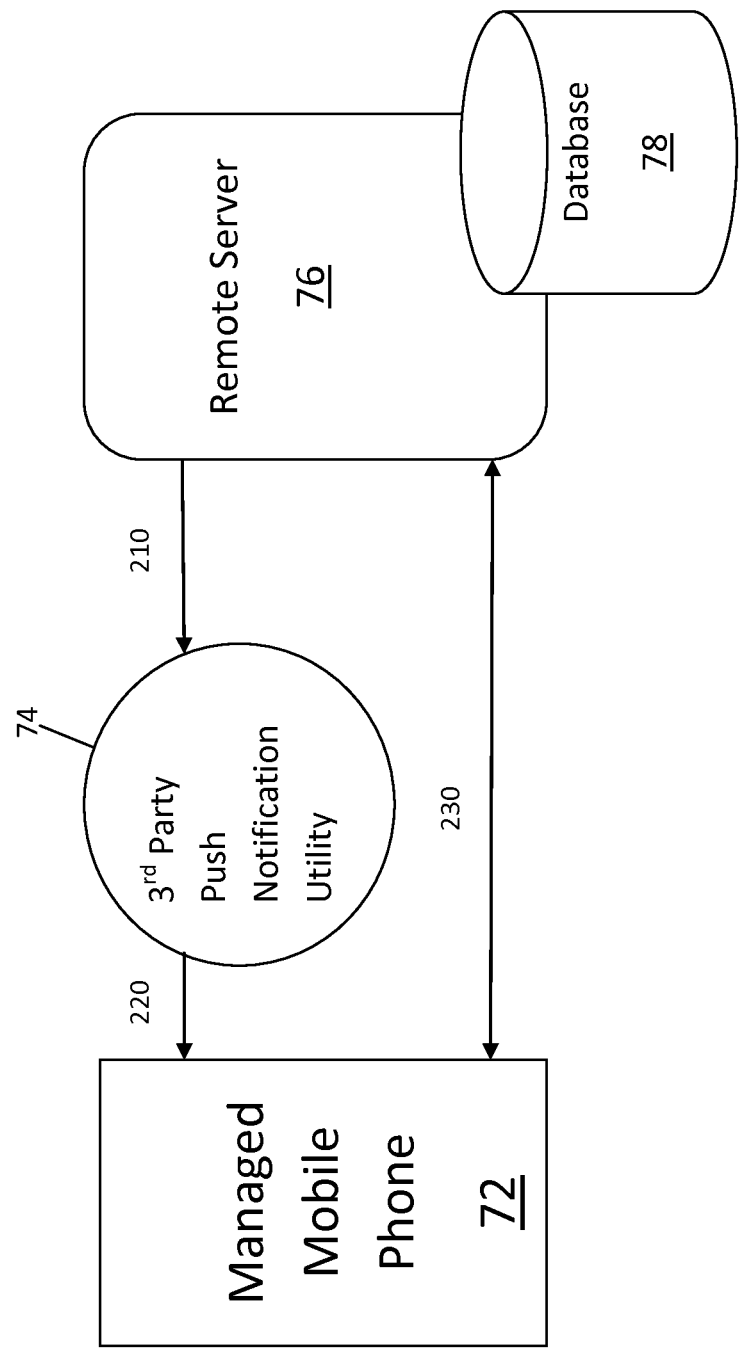
FIG. 6 illustrates the remote server of FIG. 5 sending commands to a mobile device to add or remove an access restriction.

FIG. 6 diagrammatically depicts the use of third party notifications or commands sent or pushed from the remote server 76 to a managed/enrolled mobile device 72. Such notifications or commands may be used to add or remove access restrictions on the device.

In one embodiment, the inventive system runs on top of the mobile operating system. It interacts with the GPS subsystem 20 and user interaction subsystem 22 of the phone through the mobile operating system. It is able to perform one or more of the following tasks:

1. detect the phone speed after phone is powered up by taking input from GPS subsystem 20 of the phone 10. The speed info is directly read from the Application Programming Interface (API) of the mobile operating system.

2. detect user interaction with the phone 10 by monitoring user interaction sub-system 22, including any user input to the phone such as user's press of a button, voice interaction with the phone 10, touching the phone screen etc. The inventive engine achieves this by registering with the mobile operating system for these types of events. Upon occurrence of the prohibited events, the engine is alerted by the mobile operating system as to the type of prohibited event(s).

3. If the speed exceeds a pre-defined threshold and the user is using the phone 10, the inventive engine is able to create certain outputs to the user interaction system and system interface, including rendering a pre-stored audio, video, a still image, or creating an output signal based on the rules configured when setting up the engine.

4. One of the scenarios is to create a lock screen 42 that indicates to the user that phone 10 is not usable, and also disable, prevent, or interrupt the user from having normal uninhibited interaction with the phone such as pressing a button to access the phone 10. The engine 14 may provide the user with the option to override the lock screen 42 by creating certain inputs, including pressing an 'override' button 44 on the lock screen 42 or via other forms of user inputs.

5. To continue with task #4 above, when the phone lock screen 42 is overridden, the engine 14 takes the following actions:

a. activates the camera to take a still image or record a video or an audio and store the multimedia file along with the time stamp created in the database 12 for future review by the supervising user.

b. causes the mobile operating system to send out text, emails or tweets and/or other outputs to pre-defined destinations (e.g., supervising user's email accounts, other mobile devices, Facebook accounts etc.).

FIG. 5 also illustrates the system for enrolling user mobile devices and for adding or modifying device restriction schedule and policies.

A mobile device is enrolled with the remote server 68 through the enrollment interface 66. The enrollment includes the steps of authentication and enrollment as described below:

Authentication. In this step, the system authenticates the device and/or user. User credentials such as username and password or other type of shared secrets such as biometric data can be used for authentication. Device attributes such as phone equipment identifiers (e.g., IMEI, MEID), MAC address, SIM card ID (ICCID), UDID for IOS devices may be queried and persisted at the server database during device authentication. At the end of the authentication process and if the device is authenticated, a server profile is sent to device to be stored for future communications with the server.

The above acronyms are defined as follows:

IMEI—international mobile equipment identifier, which is applicable to GSM based mobile equipment.

MEID—mobile equipment identifier, which is applicable to CDMA based mobile equipment.

ICCID—Integrated Circuit Card ID, is the serial number of the SIM card.

UDID—Unique Device Identifier is the unique identifier for all iOS devices.

A mobile management device can add or modify restriction schedule or policy for enrolled devices through a mobile interface of the server.

In one embodiment, the device management process comprises enrollment of user credentials and device identifiers, set up of restriction policies for the managed devices, and execution of the restriction policies on the managed devices. The information including the user credentials, device identifiers and policies may be stored and distributed locally at a device and/or at a remote database, provided that the various local and remote databases are synchronized with the most current or updated policies.

The user may log on to the server from a mobile device using the credential established in enrollment session to add restriction policies and schedules for one or more devices that has enrolled with the server. Restriction policies include device screen lock, configurable content displayed on the screen lock, and how to handle ongoing user events such as calls or rendering of multimedia content like music or video, whether to allow future communication events, such as incoming or outgoing call or text messages, and if yes (or allowed), how it should be handled. Restriction schedule includes one or more time slots and its repeat pattern, such as once or certain hours of a day, every day, every week day, or a particular day of the week etc.

A user may use a browser to add or modify restriction schedule or policy for enrolled devices through a web interface of the server. The user may log on to the server from web browser using the credential established in enrollment session to add restriction policies and schedules for one or more devices that has enrolled with the server. Restriction schedule includes one or more time slots and its repeat pattern, such as once, every day, every week days, or a particular day of the week and etc.

Restriction schedule or policy for enrolled devices added through browsers may be persisted into the database. Server logic is created to manage the start time and end time for all schedules of each managed device.

Restriction schedule or policy for the enrolled devices received by the server through the mobile interface are persisted into database. Server logic is created to manage the start time and end time of for all schedules of each managed device.

Enrolled devices including their associated attributes are persisted into the database. The attributes include user credentials and device credentials, such as, for example, phone equipment ID (IMEI, MEID), MAC address, SIM card ID (ICCID), and UDID for IOS devices.

In FIG. 6, the server 76 initiates a message to notify an enrolled device to connect to the server 76, optionally through a 3rd party notification utility 74 such as the Apple Push Notification Service (APNS) for iOS devices, or GCM (Google Cloud Messaging) service for Android devices, etc.

Optionally the 3rd party Notification Utility 74 sends a push message to targeted mobile device that has been enrolled in the system.

The targeted or managed mobile device connects to the remote server and retrieves and executes the command, which is either a command to restrict the use of the mobile device or a command to remove the restriction added earlier by the server.

Anti-Tampering

Figure 11:
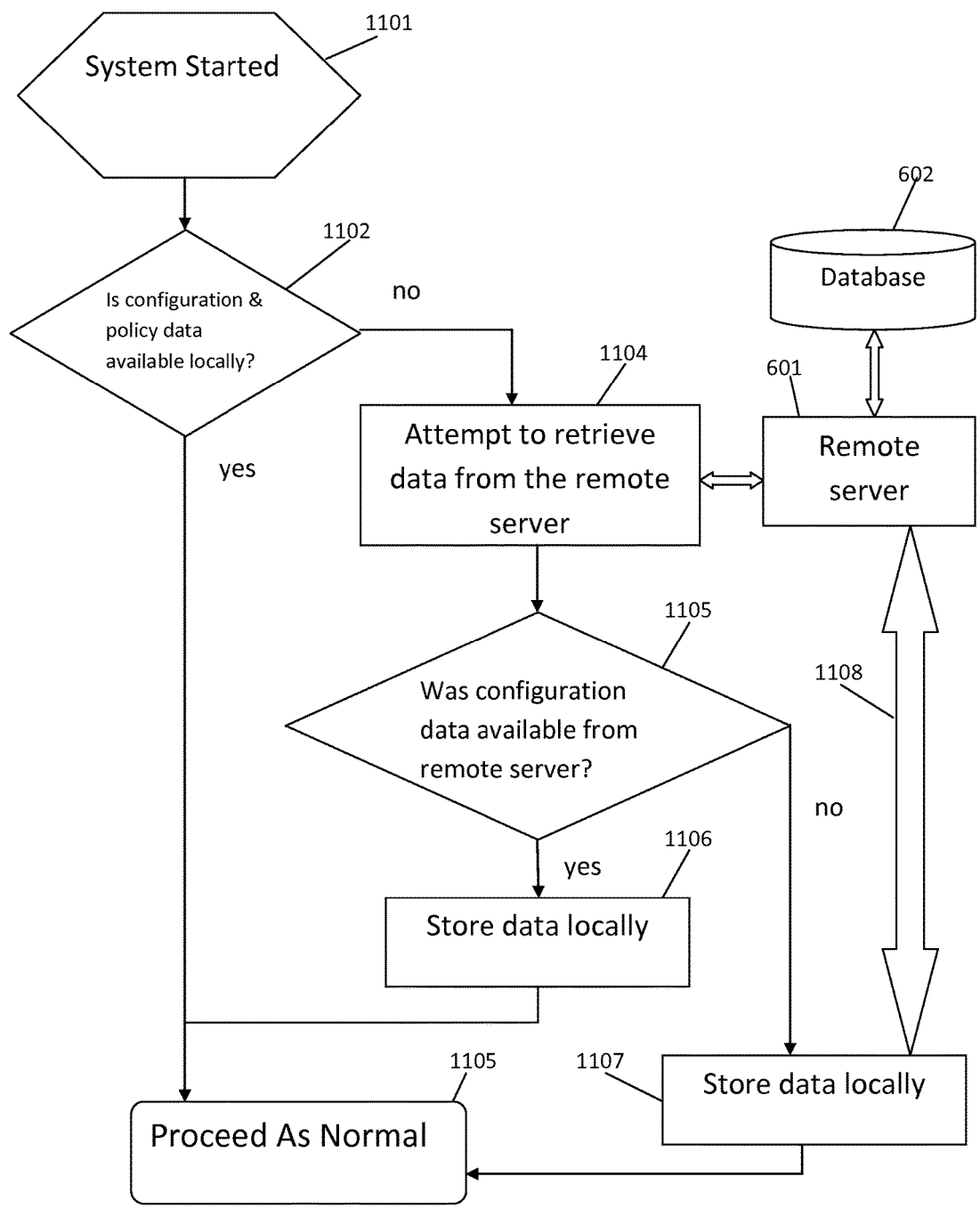
FIG. 11 is a flowchart of an embodiment of the method to retrieve configuration data from a remote server and database when no such data is available from the system's local database.

FIG. 11 flowchart shows the method when the system on the mobile device is started, that determines whether pre-configuration data is available locally or remotely. This forms part of the system's anti-tamper measures, providing a solution against deletion of configuration data by the user. It also is a convenience function for situations where the mobile device was reset, and the system reinstalled, by automatically restoring previously created configuration data. In step 1101, the system is started, and then step 1102 is done. In step 1102, the system checks, if pre-defined configuration and policy data is available locally from the system's local database or other storage mechanism. If the answer is "yes" the system will do step 1103. If "no" then the system will do step 1104. In step 1104 the system communicates with the remote server 601 to retrieve data for this user and device which may be stored in the remote database 602. Standard techniques are used to identify data to a particular device and user, including but not limited to device attributes or identifiers including IMEI, MEID, MAC address, SIM card ID, telephone number and UDID. Having received a response from the remote server, the system does step 1105. In step 1105 the system ascertains if there was configuration data available from the remote server. If "yes" the system does step 1106. If "no" the system does step 1107. In step 1106, when remote data is available, this will be stored locally on the mobile device and the system will perform step 1103. In step 1107, when no local or remote configuration data is available, the person currently accessing the system on the device, who may in fact be the supervising user, e.g., the parent or administrator, will be invited to optionally register the device, and create configuration data. This configuration data is also optionally sent to the remote server when it has been created or modified on the mobile device, shown as step 1108 so that it is available for future use. In step 1103, which is only reached when the system has the necessary and sufficient configuration and policy data to function, the system operation continues as normal, meaning that it is able to perform the monitoring and controlling of application usage on the mobile device. Note that configuration data may optionally also be created or modified by the parent or administrator remotely utilizing the components illustrated in FIG. 6 in which the parent or administrator creates or modifies the data on the remote server database using a web browser via the web interface, or using a mobile management device via the mobile management interface. The remotely configured data is available for use in this method (FIG. 11 step 1104), but also may be pushed to the managed mobile device by the remote server, using the method shown in FIG. 6.

Figure 12:
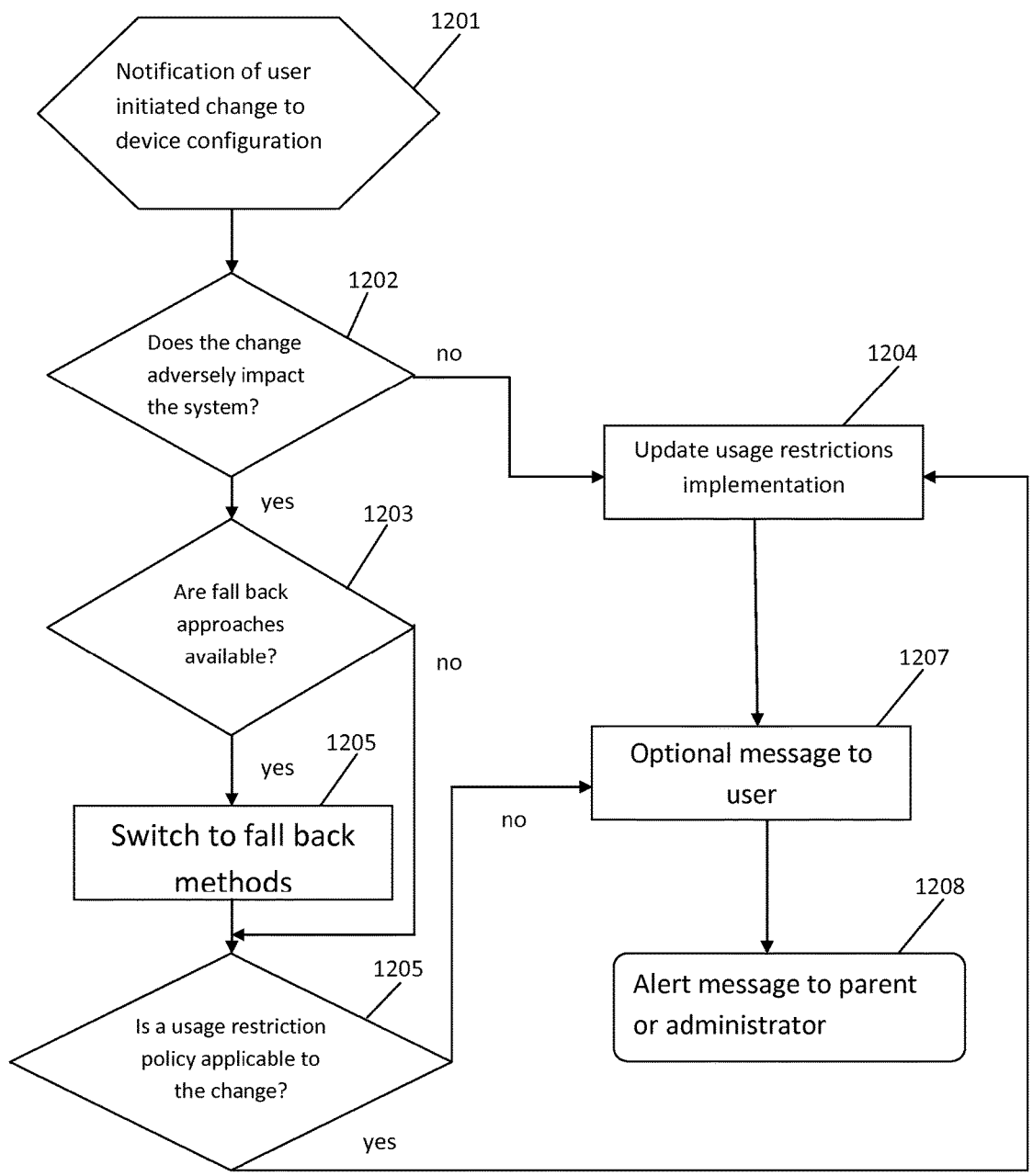
FIG. 12 is a flowchart of an embodiment of the method to handle and report user tampering events.

FIG. 12 is a flowchart illustrating the method to detect, report, and where possible, recover from changes to the operational parameters of the mobile device. This forms part of the system's anti-tamper measures, providing a mechanism to respond to user initiated changes. Such changes may be adverse, as viewed by the parent/administrator, in that they prevent the system from operating as desired or reduce the system's effectiveness or positive in that they enhance the system's performance compared to that before the change was made. Adverse impacts result from actions including but not limited to: disabling of the mobile device's GPS/Location subsystem (in an attempt to prevent location updates) or changes to the device's clock (in an attempt to work around timed application usage restrictions). Positive impacts result from actions including but not limited to: enabling of the mobile device's GPS subsystem (enables more accurate location updates). Pre-configured policies define what action to take on detection of changes to the operational parameters of the mobile device. In step 1201 the system receives notification of a user-initiated change to device configuration from the OS/Events subsystem or the GPS/Network subsystem. On receipt of this notification the system does step 1202. In step 1202, the system uses pre-defined policies to ascertain if the change adversely impacts system performance (from the perspective of the parent or administrator). If the result is "yes" the system does step 1203. If the result is "no" the system does step 1204. In step 1203, the system will check if there are fallback approaches available or specified in pre-defined policies to offset part or all of the adverse impact e.g. use network location if GPS is disabled, or use time signals from a remote server rather than the device's local clock. If "yes" there is a fall back approach the system will do step 1205. If "no" there are no available fall back approaches the system will do step 1206. In step 1205, the system will implement use of the fall back approach and then do step 1206. In step 1206 the system ascertains if a usage restriction policy is applicable to the change. Examples of usage restriction policies resulting from a change to the device configuration include disabling a child's use of selected applications as a penalty arising out of an adverse change, or if the changes to the device's operational parameters are positive, then previously applied usage restrictions may be removed. This provides a closed loop approach for parents or administrators to discourage undesirable actions by the user (especially those that cannot be prevented in other ways), but also to reward good behavior. If the output of step 1206 is "yes", the system does step 1204. If the outcome is "no", then the system does step 1207. In step 1204, the system will update usage restriction implementation. This may be the imposition of a restriction, or the removal of a previously applied restriction, if the change was positive. In step 1207 the system optionally displays a message to the device user informing them of the implemented (or removed) usage restriction and the reasoning. Having shown the message to the user, the system then optionally does step 1208 where a message is sent to the parent or administrator with information about the user-initiated change to the device configuration and the imposed (or removed) usage restrictions.

Figure 13:
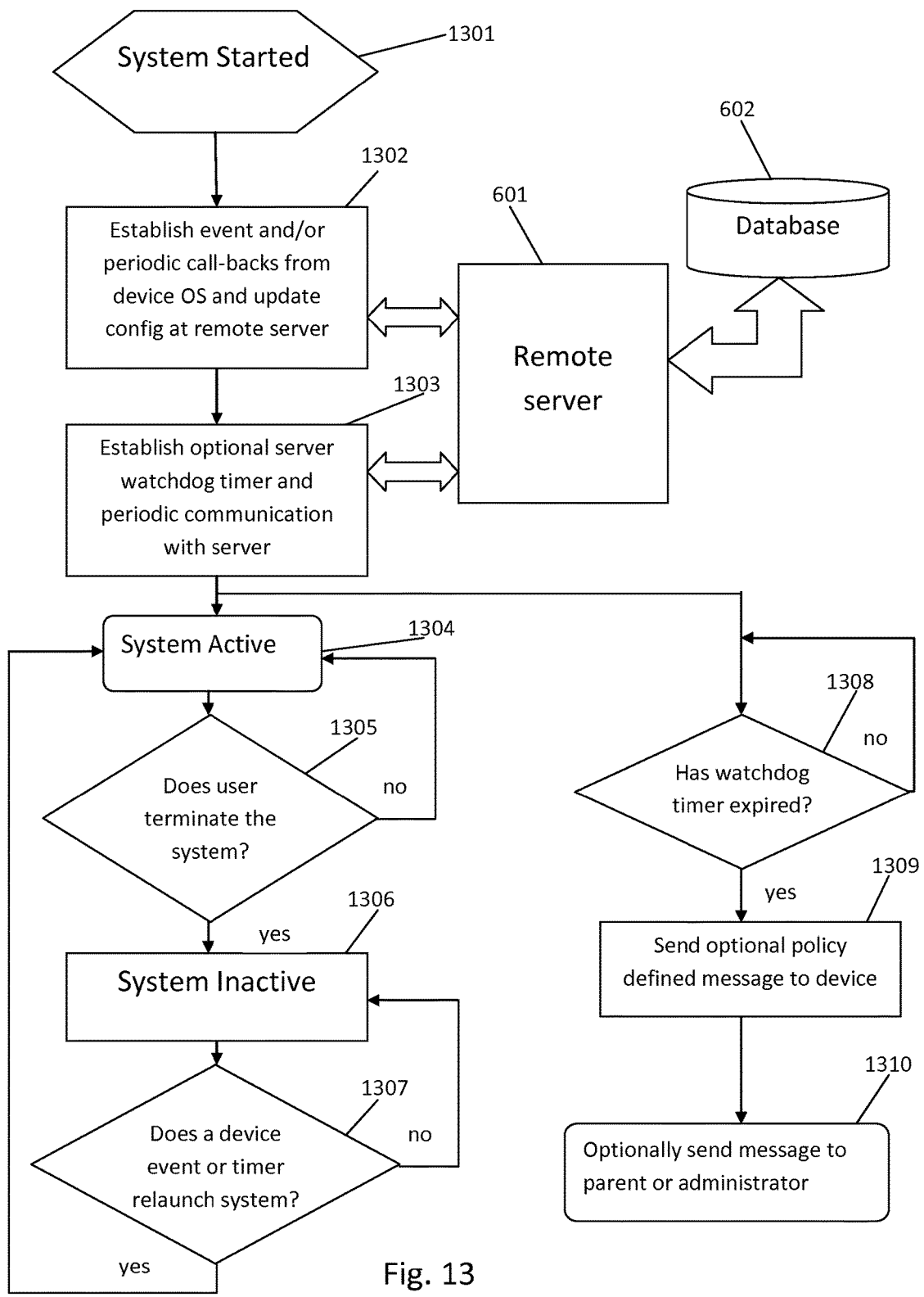
FIG. 13 is a flowchart of an embodiment of the method for auto-recovery following termination of the monitor and controlling system by user.

FIG. 13 flowchart shows yet another method forming part of the system's anti-tamper measures. The primary objective of this method is for the system to auto-recover from the system software processes on the device being stopped, and placed into an inactive state, by the user in an attempt to get around usage restrictions or prevent other system functions from operating. Different device operating systems and versions, from different manufacturers and even down to different models of device from the manufacturer, support various ways to either prevent or allow software applications and background processes that have been forcibly stopped by the user from executing themselves, such as whether timers registered with the mobile device operating system by an application to trigger future code execution, will be honored. Additionally, different device operating systems and versions support various ways an application may request to be executed when certain device events occur. Events include externally triggered events such as an incoming SMS messages or incoming data packets directed at an application installed on the device, or on-device events linked to user actions, such as waking up the device, initiating a telephone call etc. In step 1301 the system has been started, and then the system does step 1302. In step 1302 the system ascertains if the device OS provides "app-execute" call-backs, meaning can the system rely on configuring timers with the device operating system, or be called when various events occur (such as an incoming SMS) that will cause the system code on the device to be executed even if the user has terminated system operation. The system will configure and register for appropriate device events, both those that are required for normal system operation and especially those that are capable of causing an application (and hence the system's) code execution even if the system is forcibly terminated by the user. Additionally, the system will optionally communicate with the remote server 601 to allow the server to store information related to the environment that the system is operating under (device OS, device model etc.) in the remote database 602. This information will also include or allow the server to know what events are capable of causing an application (and hence the system's) code execution on the device even if the system is forcibly terminated by the user. On completion by the system of performing the above actions, the system will do step 1303. In step 1303 the system will optionally request that the server set up a watchdog timer. The server watchdog timer will govern the amount of time the server should wait if it does not receive communications from the system, before taking various actions. The system will then establish an optional periodic communication with the server, so that the server knows that the system is still operational. Note that this periodic communication will continue throughout the time that the system is active and operating on the device. Having optionally set up the periodic communication with the server, the system on the device will do step 1304, whilst the server is waiting at step 1308. In step 1304, the system on the device is running in an active state, performing the intended functions to manage and control application usage on the mobile device. At some point, the user may terminate the system on the device as indicated in step 1305, in which case the system on the device is now inactive and is at step 1306. In step 1306, the system on the device cannot itself undertake any actions, and is reliant on an event in step 1307. In step 1307, if a device event or device timer (established by the system in step 1303) occurs whereby the event or timer causes system code execution, then the system on the device returns to the active state of step 1306. On the server, in step 1308, the watchdog timer is reset whenever a periodic communication from the system on the device is received, and hence the watchdog timer does not expire. If no communications are received for a certain amount of time then the watchdog timer will expire. If the answer to "Has the watchdog timer expired?", is "no" the system loops back to step 1308. If the answer is "yes" then the system does step 1309. In step 1309 the server part of the system will send an optional policy defined message to the device, or directed at the system code on the device, to cause system code execution on the device. The type and content of the message is defined based on pre-configured policies stored on the server, cross referenced to the profile that was created for the system. For example, it may be that an SMS message sent to the device will cause execution of parts of the system code, bringing the system back into an active state. Having sent the message to the device, the system does step 1310. In step 1301 the server will optionally send a message to the parent or administrator, but especially if the server is unable to re-activate the system on the device, notifying the parent or administrator that the system is no longer functioning correctly.

Figure 14:
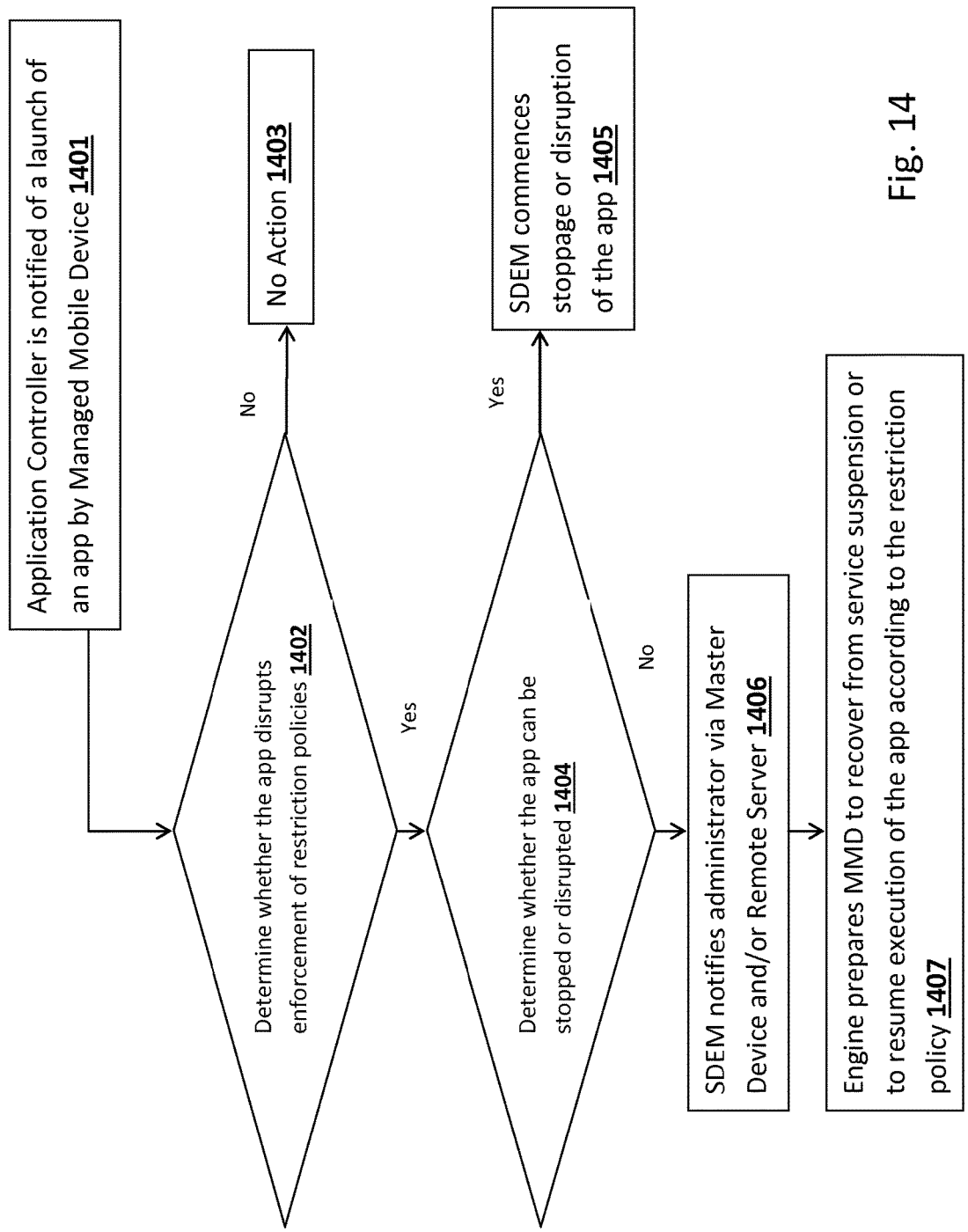
FIG. 14 depicts an exemplary process of controlling software applications launched by users of a Managed Mobile Device.

FIG. 14 shows an exemplary procedure on how the invented system handles yet another possible way of tampering by launching an application such as a task killer to terminate or circumvent the execution of the inventive system in an open OS environment. At step 1401, Application Controller (AC) is able to detect the launch or start of such 3rd party applications. The user may start such application any time, e.g., right before the scheduled restriction policy starts or even after the restriction policy is enforced. Many popular smartphones such as Samsung smartphones provide a fast key to launch a task manager at any time, and a user is able to terminate other running apps by a simple swipe. At step 1402, SDEM (i.e., Slave Device Execution Module or the execution module of the managed mobile device) will check if the launched application is such type of applications, either with local database, or optionally with the remote database of a remote server. If not, the system will not intervene (Step 1403). If yes, the SDEM will further check if there is a process to stop or disrupt the execution of such application (Step 1404). If yes, the process will be activated to prevent the user from exerting negative impact on the execution of the system (Step 1405). Given the diversity of the smartphone ecosystem, there is also a possibility that the execution of such application can't be stopped or disrupted. In this case, as indicated at Step 1406, the inventive system will alert the administrator user(s) by sending an alert either directly to the Master Device, or to the Server for storage or for it to relay the alert to other relevant or responsible administrative user(s). At step 1407, the system takes the necessary actions to prepare the MMD for future recovery in order to minimize the negative impact of its action. Such actions may include persisting current states of device operation parameters and invented system, start or adding hooks to the device operating system if possible to facilitate the recovery of the system, as stated in the description of FIG. 13.

Figure 15:
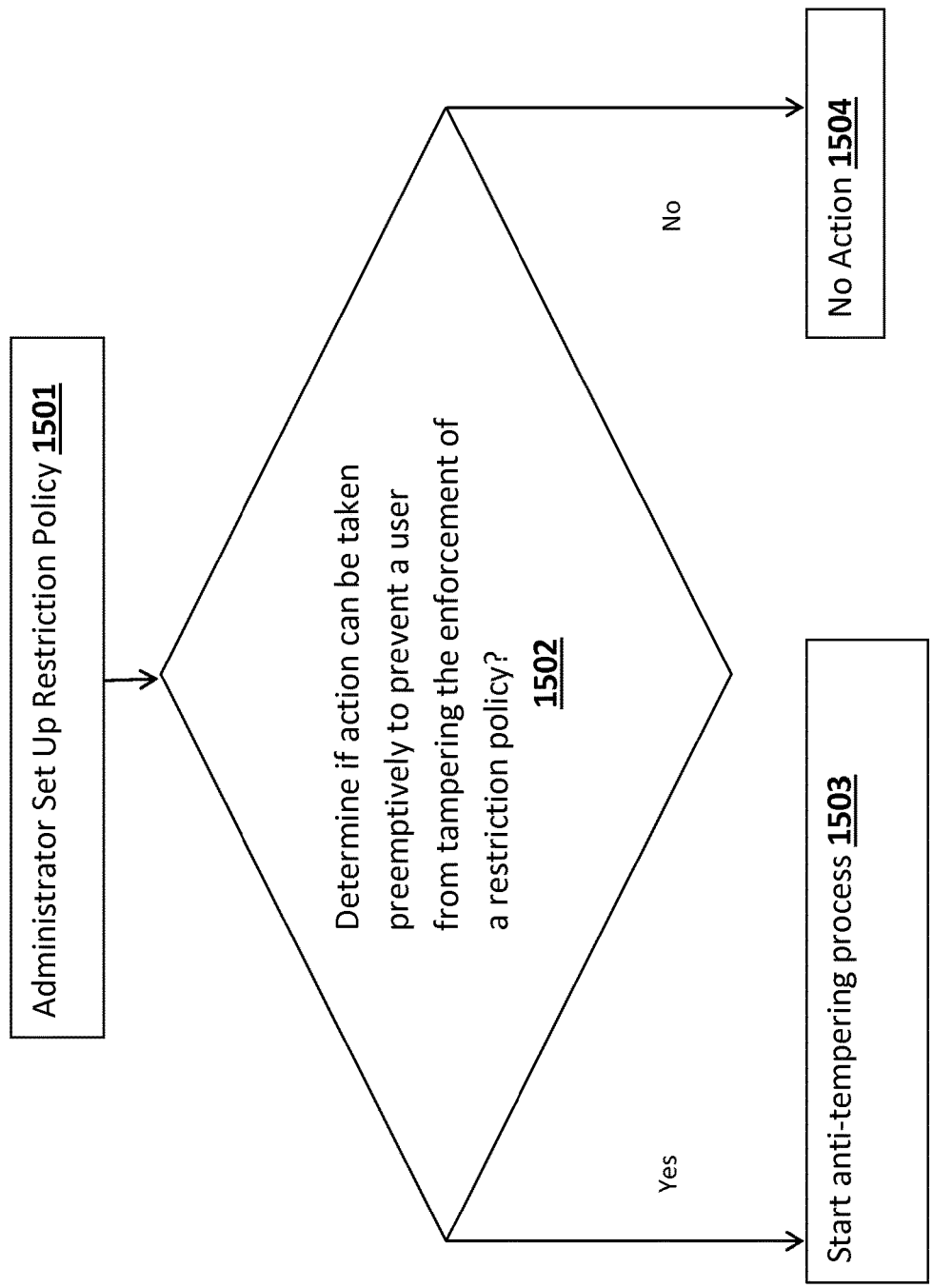
FIG. 15 diagrammatically illustrates a preemptive anti-tampering process according to an embodiment of the present invention.

FIG. 15 depicts another exemplary anti-tampering process by taking preemptive actions to prevent a user from tampering with the enforcement of a restriction policy. In Step 1501, after a restriction policy is created, the system checks if there are well known ways of working around the particular policy. For example, for a restriction policy such as a scheduled lock of the device at particular times, it is anticipated that user may change the time or time zone on the device to work around the scheduled lock. In this scenario, the inventive system may preemptively prevent user from accessing the time settings or modifying the time or time zone of the device, as described in step 1503.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer-implemented method for preventing tampering of a managed mobile device, comprising the steps of:
receiving, by at least one of a server device, a master device and the managed mobile device, a first administrator credential for identifying an administrator and a restriction policy for restricting usage of the managed mobile device;
storing in a database the first administrator credential and the restriction policy;
monitoring a user event at the managed mobile device by a user events controller in the managed mobile device, wherein the user event is one of termination or change of settings of a software application at the managed mobile device, modification of operational parameters of the managed mobile device, power on/off, and screen on/off of the managed mobile device;
enforcing the restriction policy by an execution module at the at least one of the managed mobile device, the server device, and the master device by blocking or preventing the managed mobile device from installation or deletion or launching of a software application and/or accessing at least one of web browser, a camera, a phone dialer for making calls, a messaging application for communicating messages, an app store, and contents including music, video, and apps based on ratings of these contents;
determining by the execution module whether the user event is a tampering user event that tampers with enforcement of the restriction policy by (i) deleting configuration and/or policy data from the managed mobile device; (ii) changing the operational parameters of the managed mobile device; (iii) stopping one or more system software processes of the managed mobile device that are required for the enforcement of the restriction policy; (iv) placing mobile device into an inactive state; or (v) launching an application that can terminate or circumvent the enforcement of the restriction policy; and
disrupting by the user events controller the tampering user event if the tampering user event tampers with enforcement of the restriction policy, and allowing the tampering user event to continue if the tampering user event does not tamper with enforcement of the restriction policy.

2. The method of claim 1, wherein the step of receiving includes receipt of a managed mobile device identifier for identifying the managed mobile device, and further comprising the step of associating the restriction policy with the managed mobile device identifier.

3. The method of claim 1, wherein the managed mobile device includes a communication interface for communicating with at least one of the server device and the master device.

4. The method of claim 3, wherein the database is located at a local database of the managed mobile device and at a remote database physically distinct from the managed mobile device, and further comprising the step of synchronizing by the execution module at least one of the restriction policy associated with the managed device identifier and the first administrator credential across the local and remote databases.

5. The method of claim 1, wherein the restriction policy includes a start time and an end time for locking the managed mobile device.

6. The method of claim 1, further comprising the steps of receiving a second administrator credential from a second administrator from one of the server device, the master device or the managed mobile device after authenticating the first administrator credential from the administrator, and then updating the database.

7. The method of claim 1, wherein the restriction policy restricts access to the managed mobile device by activating a screen lock on the managed mobile device and rendering a configurable content or text on the screen.

8. The method of claim 1, wherein the restriction policy includes an instruction to the execution module for processing an ongoing or future user event.

9. The method of claim 1, further comprising the step of determining by the execution module if an action can be taken preemptively to prevent a user from tampering with the enforcement of a restriction policy.

10. The method of claim 1, further comprising the step of determining by the execution module whether to enforce further restrictions to prevent a user from disrupting or terminating enforcement of a restriction policy that is yet to be enforced.

11. The method of claim 1, further comprising the step of preventing a user from modifying device operational parameters or instantiating one or more software application after a particular restriction policy is set up but before the particular restriction policy is activated.

12. The method of claim 1, wherein the user event is a direct or indirect action or input initiated or triggered by a user of the managed mobile device or by another user of a different device that is in operable communication with the managed mobile device.

13. The method of claim 1, further comprising the step of validating the first administrator credential prior to allowing a restriction policy to be changed.

14. The method of claim 1, wherein the first administrator credential includes at least one of password and biometric identification data.

15. The method of claim 7, wherein the screen lock is deactivated upon receipt of a command from the administrator after authenticating the first administrator credential of the administrator.

16. The method of claim 15, wherein the command is a Short Messaging Service message.

17. The method of claim 1, wherein each of the managed mobile device, the master device and the server device has a communications interface and is in operable communication with each other via at least one of Short Messaging Service, Internet Protocol and application protocols running on top of Internet Protocol, Near Field Communication interface, and Blue Tooth interface.

18. The method of claim 2, wherein the managed mobile device identifier includes one of International Mobile Equipment Identifier (IMEI), Mobile Equipment Identifier (MEID, Integrated Circuit Card ID (ICCID), Unique Device Identifier (UDID), and a unique identifier generated by one of the managed mobile device, master device and server device.

19. A computer-implemented method for preventing tampering of a managed mobile device, comprising the steps of:
receiving, by a server device a first administrator credential for identifying an administrator and a restriction policy for restricting usage of the managed mobile device;
storing in a database the first administrator credential and the restriction policy;

monitoring a user event at the managed mobile device by a user events controller in the managed mobile device, wherein the user event is one of termination or change of settings of a software application at the managed mobile device, modification of operational parameters of the managed mobile device, power on/off, and screen on/off of the managed mobile device;

receiving by the server device a communication relating to the user event from the managed mobile device;

interpreting the user event and enforcing the restriction policy by an execution module at the server device in response to the communication from the managed mobile device by transmitting to the managed mobile device a command in accordance with the restriction policy, wherein the restriction policy is enforced by blocking or preventing a user from installation or deletion or launching of a software application and/or accessing at least one of web browser, a camera, a phone dialer for making calls, a messaging application for communicating messages, an app store, and contents including music, video, and apps based on ratings of these contents;

executing by the user events controller the command from the server device;

determining by the execution module whether the user event is a tampering user event that tampers with enforcement of the restriction policy by (i) deleting configuration and/or policy data from the managed mobile device; (ii) changing the operational parameters of the managed mobile device; (iii) stopping one or more system software processes of the managed mobile device that is required for the enforcement of the restriction policy; (iv) placing mobile device into an inactive state; or (v) launching an application that can terminate or circumvent the enforcement of the restriction policy; and disrupting by the user events controller the tampering user event if the tampering user event tampers with enforcement of the restriction policy, and allowing the tampering user event to continue if the tampering user event does not tamper with enforcement of the restriction policy.

20. The method of claim 19, wherein the step of receiving includes receipt of a managed mobile device identifier for identifying the managed mobile device, and further comprising the step of associating the restriction policy with the managed mobile device identifier.

21. The method of claim 19, wherein the managed mobile device includes a communication interface for communicating with the server device either directly or indirectly.

22. The method of claim 21, wherein the database is located at a remote database accessible by the server device.

23. The method of claim 19, wherein the restriction policy includes a start time and an end time for locking the managed mobile device.

24. The method of claim 19, further comprising the steps of receiving a second administrator credential from a second administrator by the server device after authenticating the first administrator credential from the administrator, and then updating the database.

25. The method of claim 19, wherein the restriction policy restricts access to the managed mobile device by activating a screen lock on the managed mobile device and rendering a configurable content or text on the screen.

26. The method of claim 19, further comprising the step of validating the first administrator credential prior to allowing a restriction policy to be changed.

27. The method of claim 19, wherein the first administrator credential includes at least one of password, biometric identification data, and certificate.

28. The method of claim 25, wherein the screen lock is deactivated upon receipt of a command from the administrator after authenticating the first administrator credential of the administrator.

29. A managed mobile device having an anti-tampering mechanism, comprising:

an interface for receiving a first administrator credential for identifying an administrator and a restriction policy for restricting usage of the managed mobile device;

a database for storing the first administrator credential and the restriction policy; and a central processing unit configured to include (1) a user events controller for monitoring and identifying a user event at the managed mobile device, wherein the user event is one of termination or change of settings of a software application at the managed mobile device, modification of operational parameters of the managed mobile device, power on/off, and screen on/off of the managed mobile device, (2) an execution module for (a) enforcing the restriction policy by blocking or preventing a user from installation or deletion or launching of a software application and/or accessing at least one of web browser, a camera, a phone dialer for making calls, a messaging application for communicating messages, an app store, and contents including music, video, and apps based on ratings of these contents, (b) determining whether the user event is a tampering user event that tampers with enforcement of the restriction policy by (i) deleting configuration and/or policy data from the managed mobile device; (ii) changing the operational parameters of the managed mobile device; (iii) stopping one or more system software processes of the managed mobile device that is required for the enforcement of the restriction policy; (iv) placing mobile device into an inactive state; or (v) launching an application that can terminate or circumvent the enforcement of the restriction policy, (c) causing the user events controller to disrupt the user event if the tampering user event tampers with enforcement of the restriction policy, and (d) allowing the tampering user event to continue if the tampering user event does not tamper with enforcement of the restriction policy.

30. The device of claim 29, further including a communication interface for communicating with a peer device.

31. The device of claim 29, wherein the restriction policy includes a start time and an end time for locking the managed mobile device.

32. The device of claim 29, wherein the interface receives a second administrator credential from a second administrator after authenticating the first administrator credential from the administrator, and then updating the database.

33. The device of claim 29, wherein the restriction policy restricts access to the managed mobile device by activating a screen lock on the managed mobile device and rendering a configurable content or text on the screen.

34. The device of claim 29, wherein the restriction policy includes an instruction to the execution module for processing an ongoing or future user event.

35. The device of claim 29, wherein the execution module determines if an action can be taken preemptively to prevent a user from tampering with the enforcement of a restriction policy.

36. The device of claim 29, wherein the execution module determines whether to enforce further restrictions to prevent a user from disrupting or terminating enforcement of a restriction policy that is yet to be enforced.

37. The device of claim 29, wherein the execution module prevents a user from modifying device operational parameters or instantiating one or more software application while setting up the restriction policy or after the restriction policy is set up but before the restriction policy is activated.

38. The device of claim 29, wherein the user event is a direct or indirect action or input initiated or triggered by a user of the managed mobile device or by another user of a different device that is in operable communication with the managed mobile device.

39. The device of claim 29, wherein the execution module validates the first administrator credential prior to allowing a restriction policy to be changed.

40. The device of claim 29, wherein the first administrator credential includes at least one of password and biometric identification data.

41. The device of claim 29, wherein the screen lock is deactivated upon receipt of a command from the administrator after authenticating the first administrator credential of the administrator.

42. The device of claim 41, wherein the command is a Short Messaging Service message.

43. The device of claim 29, further comprising a communications interface for communication with a peer device via at least one of Short Messaging Service, Internet Protocol and application protocols running on top of Internet Protocol, Near Field Communication, and Blue Tooth interface.

44. A system for preventing tampering of a managed mobile device, comprising:
at least one of a server device, a master device and the managed mobile device for receiving a first administrator credential and for identifying an administrator and a restriction policy for restricting usage of the managed mobile device;
a database for storing the first administrator credential and the restriction policy;
the managed mobile device having a central processing unit configured to include a user events controller for monitoring and acting on a user event at the managed mobile device, wherein the user event is one of termination or change of settings of a software application at the managed mobile device, modification of operational parameters of the managed mobile device, power on/off, and screen on/off of the managed mobile device; and
the at least one of the managed mobile device, the server device, and the master device having a central processing unit configured to include an execution module for enforcing the restriction policy by blocking or preventing the managed mobile device from installation or deletion or launching of a software application and/or accessing at least one of web browser, a camera, a phone dialer for making calls, a messaging application for communicating messages, an app store, and contents including music, video, and apps based on ratings of these contents, (1) determining whether the user event is a tampering user event that tampers with enforcement of the restriction policy by (i) deleting configuration and/or policy data from the managed mobile device; (ii) changing the operational parameters of the managed mobile device; (iii) stopping one or more system software processes of the managed mobile device that is required for the enforcement of the restriction policy; (iv) placing mobile device into an inactive state; or (v) launching an application that can terminate or circumvent the enforcement of the restriction policy, (2) causing the user events controller to disrupt the tampering user event if the tampering user event tampers with enforcement of the restriction policy, and (3) allowing the tampering user event to continue if the tampering user event does not tamper with enforcement of the restriction policy.

45. The system of claim 44, wherein the at least one of a server device, a master device and the managed mobile device receives a managed mobile device identifier for identifying the managed mobile device, and further comprising the step of associating the restriction policy with the managed mobile device identifier.

46. The system of claim 45, wherein the managed mobile device includes a communication interface for communicating with at least one of the server device and the master device.

47. The system of claim 46, wherein the database is located at a local database of the managed mobile device and at a remote database physically distinct from the managed mobile device, and the execution module synchronizes at least one of the restriction policy associated with the managed mobile device identifier and the first administrator credential across the local and remote databases.

48. The system of claim 44, wherein the restriction policy includes a start time and an end time for locking the managed mobile device.

49. The system of claim 44, wherein the at least at least one of a server device, a master device and the managed mobile device receives a second administrator credential from a second administrator from one of the server device, the master device or the managed mobile device after authenticating the first administrator credential from the administrator, and then updating the database.

50. The system of claim 44, wherein the restriction policy restricts access to the managed mobile device by activating a screen lock on the managed mobile device and rendering a configurable content or text on the screen.

51. The system of claim 44, wherein the restriction policy includes an instruction to the execution module for processing an ongoing or future user event.

52. The system of claim 44, wherein the execution module determines if an action can be taken preemptively to prevent a user from tampering with the enforcement of a restriction policy.

53. The system of claim 44, wherein the execution module determines whether to enforce further restrictions to prevent a user from disrupting or terminating enforcement of a restriction policy that is yet to be enforced.

54. The system of claim 44, wherein the execution module prevents a user from modifying device operational parameters or instantiating one or more software application after a particular restriction policy is set up but before the particular restriction policy is activated.

55. The system of claim 44, wherein the user event is a direct or indirect action or input initiated or triggered by a user of the managed mobile device or by another user of a different device that is in operable communication with the managed mobile device.

56. The system of claim 44, wherein the execution module validates the first administrator credential prior to allowing a restriction policy to be changed.

57. The system of claim 44, wherein the first administrator credential includes at least one of password and biometric identification data.

58. The system of claim 50, wherein the screen lock is deactivated by the execution module upon receipt of a command from the administrator after authenticating the first administrator credential of the administrator.

59. The system of claim 58, wherein the command is a Short Messaging Service message.

60. The system of claim 44, wherein each of the managed mobile device, the master device and the server device has a communications interface and is in operable communication with each other via at least one of Short Messaging Service, Internet Protocol and application protocols running on top of Internet Protocol, Near Field Communication, and Blue Tooth interface.

61. The system of claim 45, wherein the managed mobile device identifier includes one of International Mobile Equipment Identifier (IMEI), Mobile Equipment Identifier (MEID, Integrated Circuit Card ID (ICCID), Unique Device Identifier (UDID), and a unique identifier generated by one of the managed mobile device, master device and server device.

\* \* \* \* \*